(12) United States Patent
Fukuda

(10) Patent No.: US 10,757,269 B2
(45) Date of Patent: Aug. 25, 2020

(54) IMAGE FORMING SYSTEM, DENSITY ADJUSTING METHOD, AND RECORDING MEDIUM

(71) Applicant: Hiroaki Fukuda, Kanagawa (JP)

(72) Inventor: Hiroaki Fukuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/419,065

(22) Filed: May 22, 2019

(65) Prior Publication Data

US 2020/0023649 A1 Jan. 23, 2020

(30) Foreign Application Priority Data

Jul. 23, 2018 (JP) ................................ 2018-137341

(51) Int. Cl.

| H04N 1/00 | (2006.01) |
|---|---|
| H04N 1/407 | (2006.01) |
| G06K 15/02 | (2006.01) |
| B41J 2/045 | (2006.01) |
| B41J 2/21 | (2006.01) |
| H04N 1/60 | (2006.01) |
| B41J 25/00 | (2006.01) |

(52) U.S. Cl.
CPC ...... *H04N 1/00015* (2013.01); *B41J 2/04558* (2013.01); *B41J 2/2139* (2013.01); *G06K 15/027* (2013.01); *G06K 15/1872* (2013.01); *H04N 1/00023* (2013.01); *H04N 1/00034* (2013.01); *H04N 1/00045* (2013.01); *H04N 1/00068* (2013.01); *H04N 1/00074* (2013.01); *H04N 1/00087* (2013.01); *H04N 1/4078* (2013.01); *H04N 1/6027* (2013.01); *B41J 2025/008* (2013.01)

(58) Field of Classification Search
None
See application file for complete search history.

(56) References Cited

U.S. PATENT DOCUMENTS

| 8,305,664 B2 * | 11/2012 | Yasunaga | ............. | H04N 1/4015 |
| | | | | 358/1.9 |
| 8,928,938 B2 * | 1/2015 | Ohira | ................... | G03G 15/502 |
| | | | | 358/1.9 |

FOREIGN PATENT DOCUMENTS

| JP | 6-091998 | 4/1994 |
| JP | 2010-166506 | 7/2010 |

* cited by examiner

*Primary Examiner* — Scott A Rogers
(74) *Attorney, Agent, or Firm* — Harness, Dickey & Pierce, P.L.C.

(57) ABSTRACT

An image forming system includes an image forming apparatus configured to form an image on a recording medium and an output device configured to output information for a user. The image forming system further includes circuitry configured to acquire, from a reading device read data of the image on the recording medium; calculate a correction value of an image density of the read image; cause the image forming apparatus to form, on a recording medium, a corrected image based on the correction value; and acquire, from the reading device, read data of the corrected image; and cause the output device to output report information representing a relation between a density variation value of the corrected image and a threshold of the density variation value.

11 Claims, 15 Drawing Sheets

FIG. 11

DENSITY VARIATION THRESHOLD SETTING — 710b

SETTING VALUE — 715b

| | |
|---|---|
| CYAN | 0.10 |
| MAGENTA | 0.10 |
| YELLOW | 0.12 |
| BLACK | – |

OK — 711
CANCEL — 713

FIG. 12

DENSITY VARIATION THRESHOLD SETTING — 710c

SETTING VALUE — 715c

| | | | | | | | |
|---|---|---|---|---|---|---|---|
| CYAN | – | 0.10 | 0.10 | 0.10 | 0.08 | 0.08 | – |
| MAGENTA | – | 0.10 | 0.10 | 0.10 | 0.08 | – | – |
| YELLOW | – | 0.12 | 0.12 | 0.12 | 0.10 | – | – |
| BLACK | 0.20 | – | – | – | – | 0.20 | – |

← SHEET WIDTH →

OK — 711
CANCEL — 713

| GRADATION INPUT VALUE | GRADATION OUTPUT VALUE |
|---|---|
| 0 | 0 |
| 16 | 38 |
| 32 | 49 |
| 48 | 63 |
| 64 | 73 |
| 80 | 97 |
| 96 | 110 |
| 112 | 131 |
| 128 | 150 |
| 144 | 162 |
| 160 | 175 |
| 176 | 192 |
| 192 | 210 |
| 208 | 228 |
| 224 | 250 |
| 240 | 255 |
| 255 | 255 |

DENSITY ADJUSTMENT RESULT — 730

| | SETTING VALUE | CORRECTION RESULT |
|---|---|---|
| CYAN | 0.10 | 0.03 |
| MAGENTA | 0.10 | 0.14 |
| YELLOW | 0.12 | 0.08 |
| BLACK | 0.08 | 0.03 |

735 !

CONTINUE — 731  OK — 733

IMAGE FORMING SYSTEM, DENSITY ADJUSTING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-137341, filed on Jul. 23, 2018, in the Japan Patent Office, the entire disclosure of which is hereby incorporated by reference herein.

BACKGROUND

Technical Field

The present disclosure relates to an image forming system, a density adjusting method, and a recording medium.

Description of the Related Art

Generally, an image forming apparatus (an image output apparatus) uses a plurality of liquid discharge heads (print heads), each of which includes a plurality of discharge nozzles (print elements) to discharge same color ink (an image forming agent having a same color tone).

Regarding liquid discharge heads for inkjet image forming apparatuses, dimensional error (tolerance) in manufacturing or the like can cause variations in discharge speed and amount of liquid discharged, among a plurality of liquid discharge heads. Such variations increase the possibility of uneven density in an image formed on a recording medium (a target on which an image is recorded).

Therefore, there is a technique for detecting the uneven density of the liquid discharged, onto the recording medium, from the liquid discharge heads and correcting an output value from the liquid discharge head based on the result of detection, to make the density of the image uniform.

SUMMARY

According to an embodiment of this disclosure, an image forming system includes an image forming apparatus configured to form an image on a recording medium and an output device configured to output information for a user. The image forming system further includes circuitry configured to acquire, from a reading device, read data of the image on the recording medium; calculate a correction value of an image density of the read image; cause the image forming apparatus to form, on a recording medium, a corrected image based on the correction value; acquire, from the reading device, read data of the corrected image; and cause the output device to output report information representing a relation between a density variation value of the corrected image and a threshold of the density variation value.

Another embodiment provides a density adjusting method performed by an image forming system. The density adjusting method includes acquiring read data of an image formed on a recording medium by an image forming apparatus; calculating a correction value of an image density of the read image; forming, with the image forming apparatus, a corrected image on a recording medium, based on the correction value of the density of the read image; acquiring read data of the corrected image; and outputting report information representing a relation between a density variation value of the corrected image and a threshold defining an allowable range of the density variation value.

Another embodiment provides a non-transitory recording medium storing a plurality of program codes which, when executed by one or more processors, causes the processors to perform the density adjusting method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11 illustrates another example of the threshold setting screen displayed on the printer according to Embodiment 1;

FIG. 12 illustrates another example of the threshold setting screen displayed on the printer according to Embodiment 1;

FIG. 17 is a view of an example of a notification screen displayed on the printer according to Embodiment 1.

Figure 1:
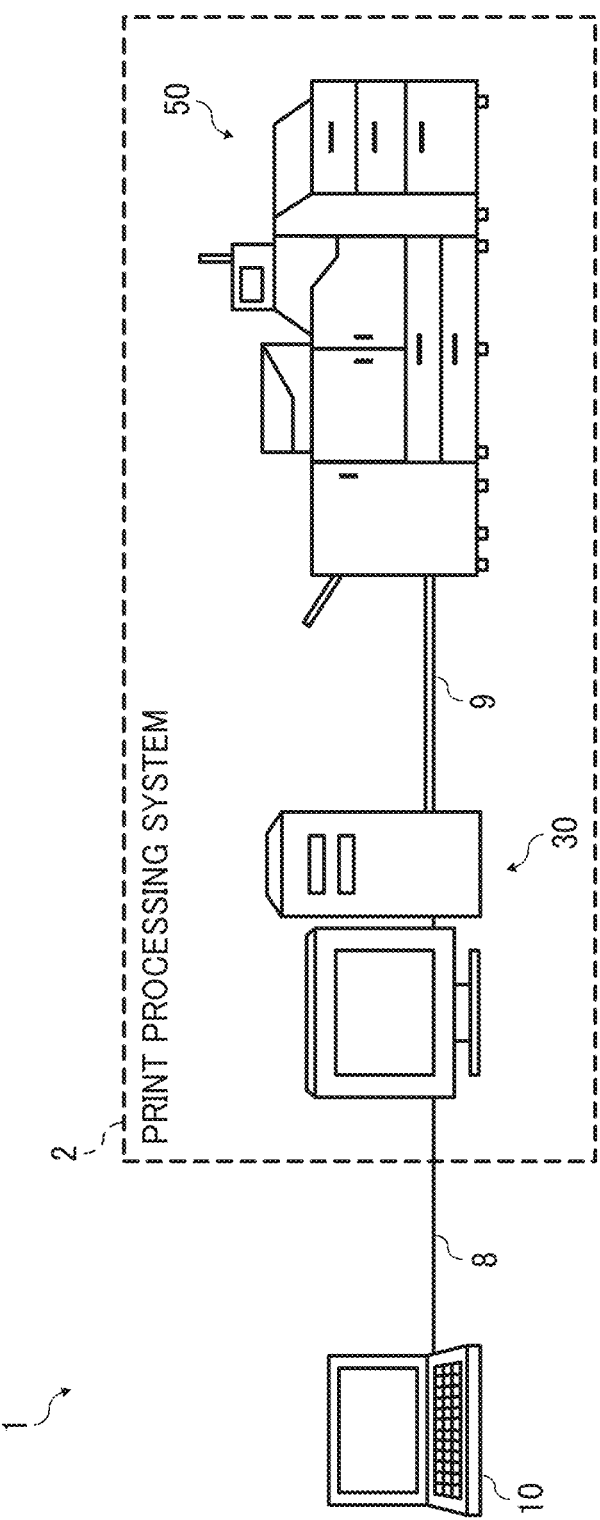
FIG. 1 is a block diagram illustrating a configuration of a printing system according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image forming system according to an embodiment of this disclosure is described. As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

Embodiment 1

System Configuration

FIG. 1 is a block diagram illustrating a configuration of a printing system according to Embodiment 1. The printing system 1 is a system capable of improving the efficiency of inspection by a user of the density of an image formed on a recording medium.

As illustrated in FIG. 1, the printing system 1 includes a communication terminal 10 and a print processing system 2. The printing system 1 is an example of an image forming system. The print processing system 2 includes a printing control apparatus 30 such as digital front end (DFE) server and a printer 50. Although the printing system 1 as the image forming system includes the communication terminal 10 in the example illustrated in FIG. 1, the functions of the communication terminal 10 can be implemented by, for example, the printing control apparatus 30 so that the print processing system 2 itself serves as the image forming system.

The communication terminal 10 and the printing control apparatus 30 are communicable with each other via a first network such as a local area network (LAN) 8. The printing control apparatus 30 and the printer 50 are communicable with each other via a second communication network such as a dedicated line 9. In the following description, production printing (image formation) by the printing system 1 will be described as an example, but embodiments of the present disclosure can be applied to other types of printing systems.

The communication terminal 10 is, for example, a personal computer (PC) for viewing and editing print data that is an example of image formation target data. The communication terminal 10 is not limited to a PC but can be, for example, a mobile phone, a smartphone, a tablet terminal, a digital camera, or the like. The printing control apparatus 30 is a server computer. Specifically, the printing control apparatus 30 generates bitmap data for printing, based on print data sent from the communication terminal 10, and sends the generated bitmap data and a print instruction to the printer 50. The printing control apparatus 30 is an example of an image formation control apparatus. The printer 50 prints an image on a recording sheet based on the bitmap data transmitted from the printing control apparatus 30. The printer 50 is an example of an image forming apparatus.

Although FIG. 1 illustrates the printing system 1 including one communication terminal 10, one printing control apparatus 30, and one printer 50, but embodiments of the present disclosure are not limited thereto. For example, in the printing system 1, the number of, at least one of, the communication terminal 10, the printing control apparatus 30, and the printer 50 can be a plural number. In the example described below, the print processing system 2 includes the printing control apparatus 30 and the printer 50. However, a function of the printing control apparatus 30 can be fulfilled by the printer 50 so that the print processing system 2 is constituted by the printer 50 only.

Figure 2:
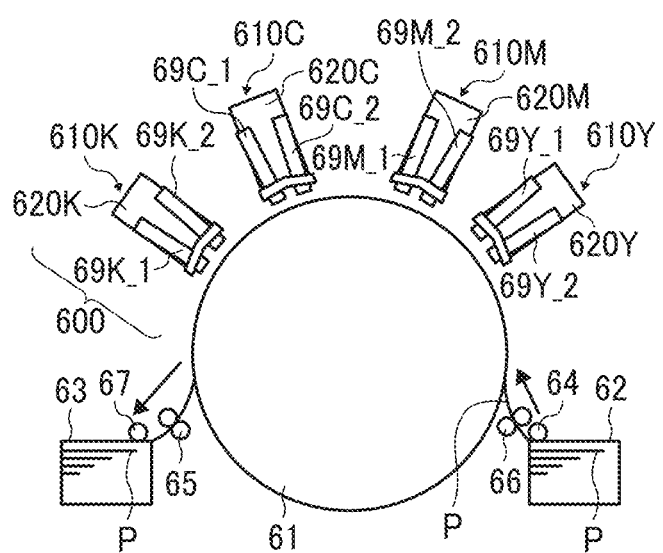
FIG. 2 is a schematic front view illustrating an example of a configuration of a printer according to Embodiment 1.

Next, a configuration of the printer 50 will be described with reference to FIGS. 2 to 4. FIG. 2 is a schematic front view illustrating an example of the configuration of the printer according to Embodiment 1. The printer 50 illustrated in FIG. 2 is a liquid discharge apparatus that includes liquid discharge heads 69 to discharge liquid and apply the liquid onto a recording medium. For example, the printer 50 discharges ink as a liquid from the liquid discharge heads 69 to form an image on a recording medium such as a sheet P (e.g., a paper sheet).

As illustrated in FIG. 2, the printer 50 includes a conveyor drum 61, a sheet feeding tray 62, an output tray 63, and a head array 600. The conveyor drum 61 holds and conveys the sheet P on the circumferential surface thereof at the time of liquid discharge. The sheet feeding tray 62 accommodates the sheets P and supplies the sheets P to the conveyor drum 61. On the circumferential surface of the conveyor drum 61, the liquid is applied to the sheet P while the sheet P is conveyed. Then, the sheet P is received on the output tray 63 and stacked one by one therein. The head array 600 discharges the liquid onto the sheet P held on the circumferential surface of the conveyor drum 61.

The conveyor drum 61 attracts the sheet P sent, for example, from the sheet feeding tray 62 to the drum side. The circumferential surface of the conveyor drum 61 is provided with a plurality of small through-holes penetrating into a negative pressure space inside the conveyor drum 61. The conveyor drum 61 is provided with a negative pressure generating pump to maintain a negative pressure in the negative pressure space. Accordingly, the sheet P is attracted to the circumferential surface of the conveyor drum 61 in tight contact.

The sheets P stacked in the sheet feeding tray 62 are separated by a separation roller 64 and a sheet feeding roller 66 and conveyed one by one to a conveying portion of the conveyor drum 61. The conveying portion is the surface of an upper half of the conveyor drum 61 and a range between a sheet feeding position and a sheet ejection position. As the sheet P to which the liquid is applied is conveyed to the sheet ejection position on the circumferential surface of the conveyor drum 61, an output roller pair 65 and a forwarding roller 67 separate the sheet P from the conveyor drum 61 and stack the sheet P on the output tray 63.

As illustrated in FIG. 2, the head array 600 includes four head units 610K, 610C, 610M, and 610Y disposed radially around the conveying portion of the conveyor drum 61, that is, the upper half of the conveyor drum 61. The head units 610K, 610C, 610M, and 610Y are also collectively referred to as "head units 610" when discrimination is not necessary.

As illustrated in FIG. 2, each head unit 610 includes a base frame 620K, 620C, 620M, or 620Y (also collectively "base frame 620") and a plurality of liquid discharge heads 69 held by the base frame 620. The longitudinal direction (in the Z axis direction) of each base frame 620 coincides with the axial direction of the conveyor drum 61, and both ends of the base frame 620 in the longitudinal direction correspond to ends of the conveyor drum 61 in the longitudinal direction. The base frame 620 further includes a discharge mechanism that contributes to liquid discharge from the liquid discharge heads 69. The discharge mechanism includes, for example, at least one of a head tank to contain the liquid to be discharged from the liquid discharge heads 69, a carriage, a supply mechanism, a maintenance unit, and a main-scan moving unit.

The liquid discharge heads 69 discharge the liquid and apply the liquid to an object (the recording medium) such as the sheet P. FIG. 3 is a schematic diagram illustrating an example of the configuration of the head array according to Embodiment 1. The head array 600 illustrated in FIG. 3 includes the plurality of head units 610 (the head units 610K, 610C, 610M, and 610Y). The head unit 610 discharges liquid (ink) of basic colors of, for example, black (K), cyan (C), magenta (M), and yellow (Y) and forms an image on the sheet P. The head array 600 can further include a head unit that discharges liquid (ink) of a special color such as orange or violet, a head unit that discharges liquid for overcoat for gloss level improvement or other treatment, or the like.

In the head unit 610, the plurality of liquid discharge heads 69 is in a staggered arrangement. The liquid discharge heads 69 are arranged along a sub-scanning direction (the Z axis direction) orthogonal to the main scanning direction (the X axis direction), in which the conveyor drum 61 rotates. As illustrated in FIG. 3, in each head unit 610, the plurality of liquid discharge heads 69 is arranged in two rows in a zigzag manner. The head unit 610K includes head rows 631K and 632K. The head unit 610C includes head rows 631C and 632C. The head unit 610M includes head rows 631M and 632M. The head unit 610Y includes head rows 631Y and 632Y. The head rows 631K, 631C, 631M, and 631Y are collectively referred to as "head rows 631", and the head rows 632K, 632C, 632M, and 632Y are collectively referred to as "head row 632". The liquid discharge heads 69 in different rows are shifted by a half pitch in the Z axis direction in FIG. 3 (the sub-scanning direction). For example, the liquid discharge heads 69 of the head row 631K are shifted by a half pitch from the liquid discharge heads 69 of the head row 632K. The plurality of liquid discharge heads 69 is arranged along a first direction (the Z axis direction). Specifically, the liquid discharge heads 69 are arranged such that, when viewed from a second direction (X axis direction) orthogonal to the first direction, the liquid discharge heads 69 adjacent in the first direction overlap with each other in some areas.

Figure 3:
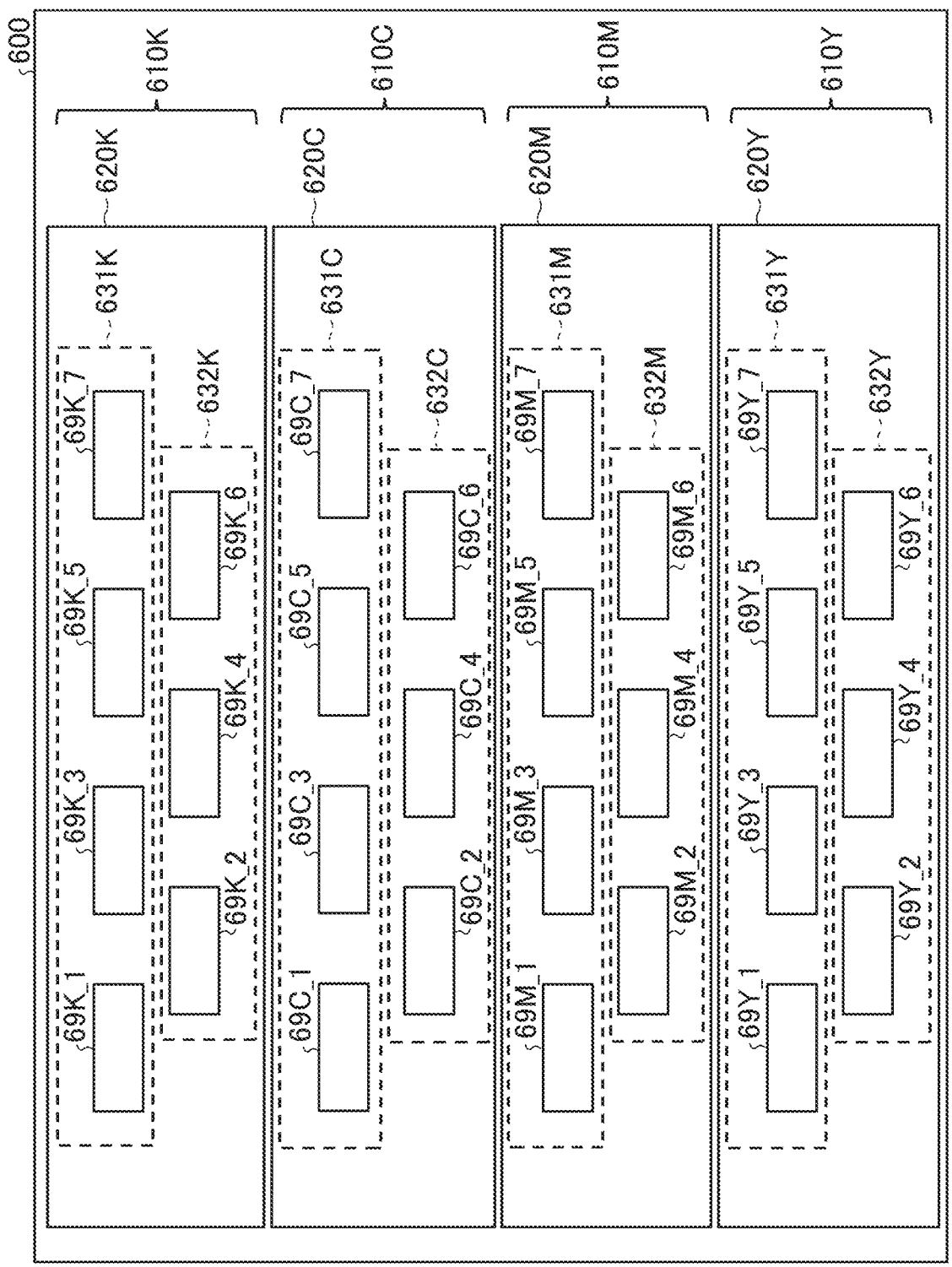
FIG. 3 is a schematic front view illustrating an example of a configuration of a head array according to Embodiment 1.

In FIG. 3, the head unit 610K includes first to seventh liquid discharge heads 69K_1 to 69K_7. The head unit 610C includes first to seventh liquid discharge heads 69C_1 to 69C_7. The head unit 610M includes seven liquid discharge heads 69M_1 to 69M_7. The head unit 610Y includes seven liquid discharge heads 69Y_1 to 69Y_7.

In the example illustrated in FIG. 3, one (e.g., the head row 631) of the two rows of the head unit 610 has four liquid discharge heads 69, and the other (e.g., the head row 632) has three liquid discharge heads 69. The number of liquid discharge heads 69 in the rows of each head unit 610 is not limited thereto but can be greater than four and three, respectively. Alternatively, the same number of liquid discharge heads 69 can be provided in each row. The number of rows of the liquid discharge heads 69 in each head unit 610 is not limited thereto. Alternatively, the liquid discharge heads 69 can be arranged in three or more rows in a staggered arrangement.

Depending on the liquid discharge characteristics or the like, the amount of liquid discharged therefrom may be different among the plurality of liquid discharge heads 69. Therefore, as a result of printing, a color difference (density unevenness) occurs between the liquid discharge heads 69 that has discharged the liquid onto the sheet P or among nozzles in one liquid discharge head 69. Therefore, the print processing system 2 corrects the density difference of the liquid discharged from each liquid discharge head 69 and the density difference of the liquid applied near the boundary between the liquid discharge heads 69, thereby equalizing the density (color) of the image formed on the recording medium such as the sheet P.

Figure 4:
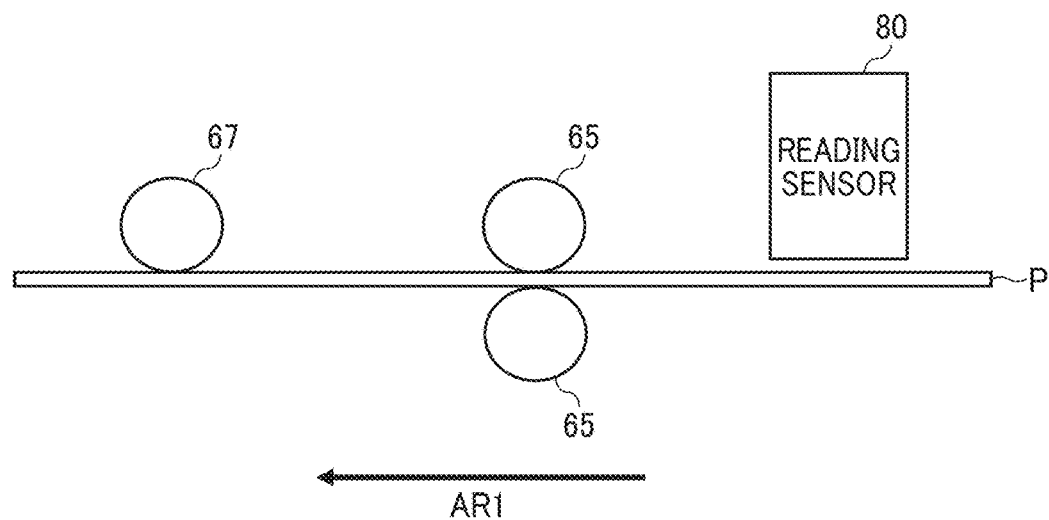
FIG. 4 is a schematic view illustrating an example of placement of a reading sensor in the printer according to Embodiment 1.

FIG. 4 is a schematic view illustrating an example of placement of a reading sensor in the printer according to Embodiment 1. In FIG. 4, arrow AR1 indicates the direction in which the sheet P is ejected. The printer 50 includes a reading sensor 80 disposed in a passage of printing (in the printer 50) along which an image is formed on a recording medium, such as a sheet P. The printer 50 prints an image on the sheet P according to a print instruction transmitted from the printing control apparatus 30 to the printer 50. The reading sensor 80 reads the image on the sheet P at the time of printing in the printer 50. The printer 50 transmits image data (read data) read by the reading sensor 80 to the printing control apparatus 30.

Hardware Configuration

Figure 5:
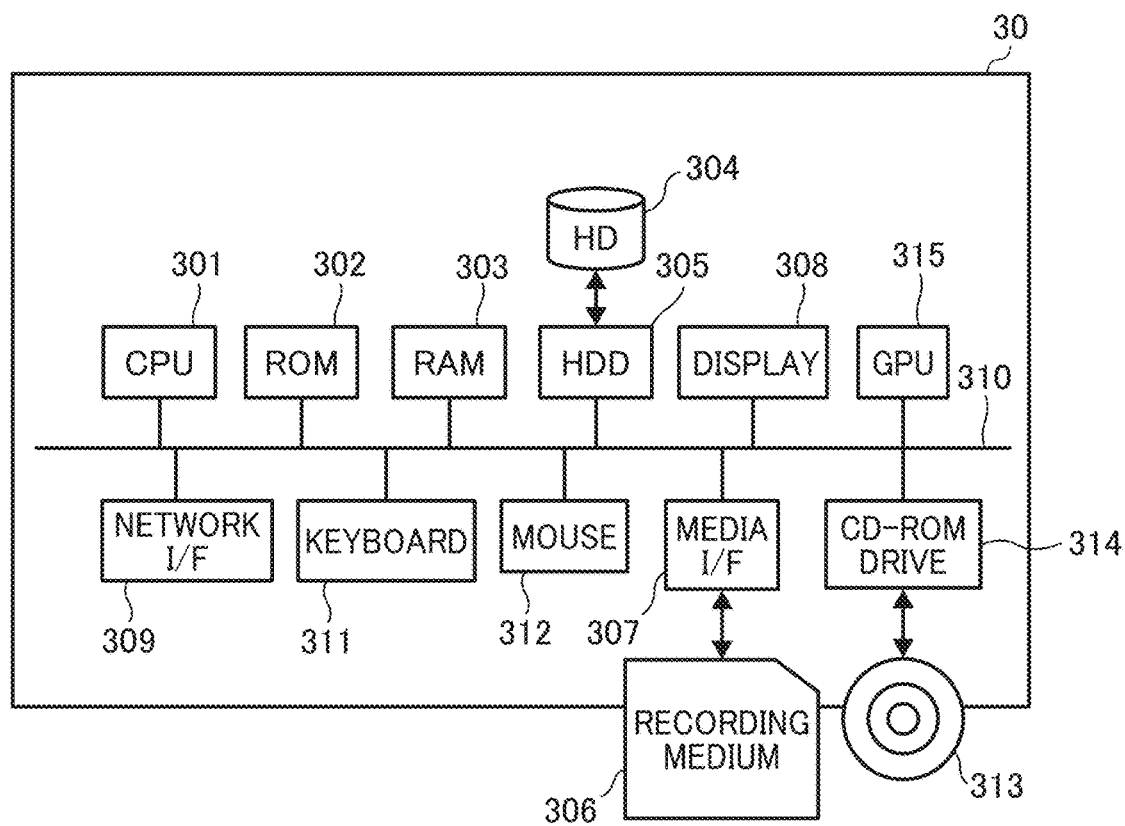
FIG. 5 is a block diagram illustrating an example of a hardware configuration of a printing control apparatus according to Embodiment 1.

Referring to FIG. 5, a hardware configuration of the printing control apparatus 30 is described. FIG. 5 is a block diagram illustrating an example of the hardware configuration of the printing control apparatus according to Embodiment 1. The hardware configuration illustrated in FIG. 5 can be the same among the different embodiments. Alternatively, an element can be added thereto or deleted therefrom as necessary.

As illustrated in FIG. 5, the printing control apparatus 30 includes a central processing unit (CPU) 301 that controls the overall operation of the printing control apparatus 30, a read only memory (ROM) 302 that stores programs, such as an initial program loader (IPL), used for driving the CPU 301, a random access memory (RAM) 303 used as a work area of the CPU 301, a hard disk (HD) 304 for storing various data such as a position information management program, a hard disk drive (HDD) 305 for controlling reading various data from the HD 304 and writing data therein under the control of the CPU 301, and a media interface (I/F) 307 for controlling data reading to or data writing (storing) on a recording medium 306 such as a flash memory. The printing control apparatus 30 further includes a display 308 to display various information such as a cursor, a menu, a window, characters, and images, a network interface (I/F) 309 for data communication via a communication network, a keyboard 311 that includes a plurality of keys for a user to input characters, numbers, and various types of instructions, and a mouse 312 for the user to input an instruction for selecting and executing various instructions, selecting a target to be processed, or moving the cursor. The printing control apparatus 30 further includes a compact disc read only memory (CD-ROM) drive 314 for controlling various data reading from or various data writing to a CD-ROM 313 as an example of a removable recording medium, a graphics processing unit (GPU) 315 having an arithmetic function corresponding to an application programming interface (API) such as open graphics library (OpenGL), to realize high-speed image processing operation, and a bus line 310 that electrically connects the hardware elements mentioned above. Examples of the bus line 310 include an address bus and a data bus.

The hardware configuration of the communication terminal 10 is the same as the hardware configuration of the printing control apparatus 30 illustrated in FIG. 5, and the description thereof will be omitted.

Figure 6:
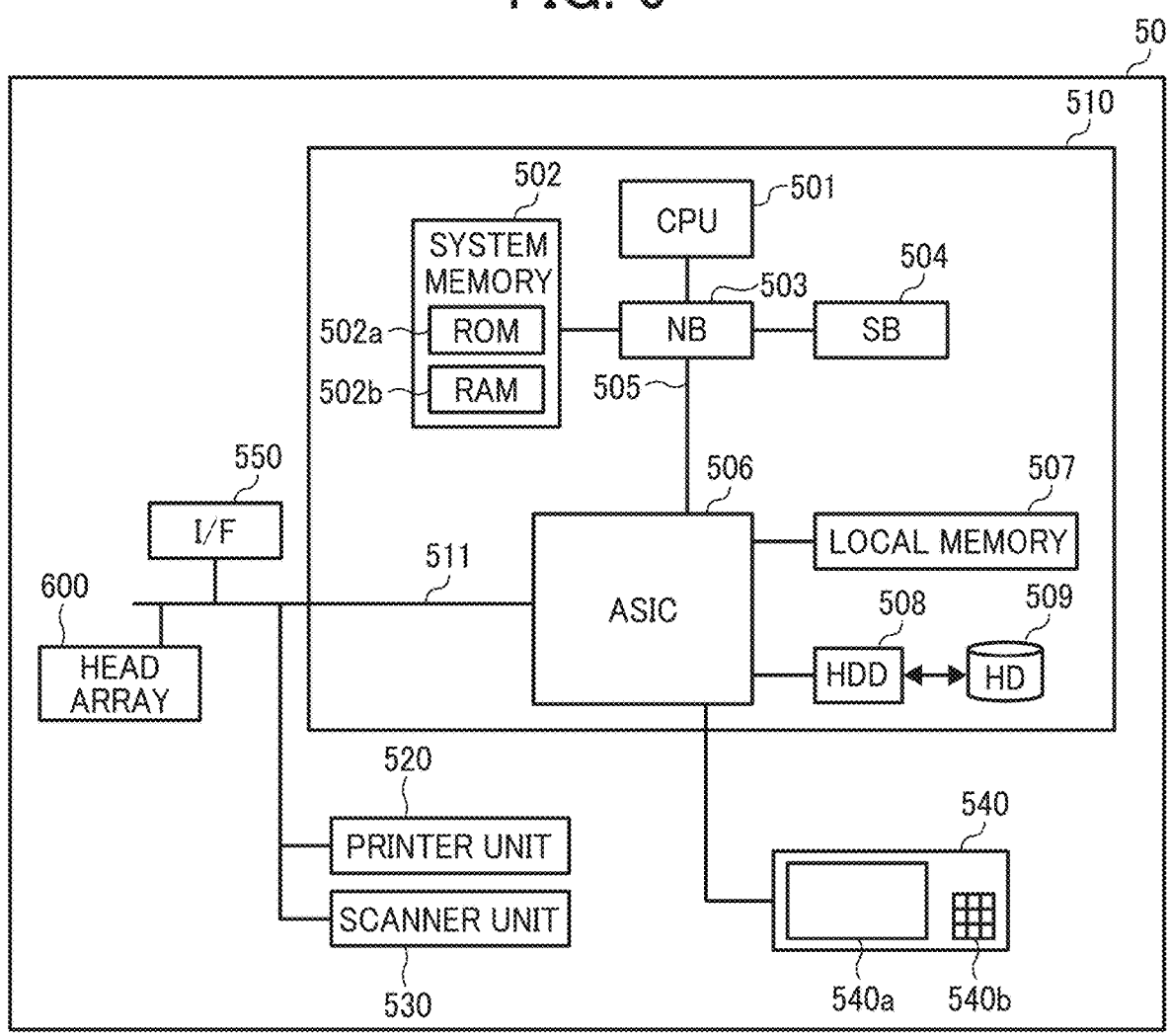
FIG. 6 is a block diagram illustrating an example of a hardware configuration of the printer according to Embodiment 1.

Referring to FIG. 6, a hardware configuration of the printer 50 is described. FIG. 6 is a block diagram illustrating an example of the hardware configuration of the printer according to Embodiment 1. The hardware configuration illustrated in FIG. 6 can be the same among different embodiments. Alternatively, an element can be added thereto or deleted therefrom as necessary.

The printer 50 includes a controller 510, a printer unit 520 (an image forming device), a scanner unit 530 (a reading device), a control panel 540, an I/F 550, and the head array 600. The printer unit 520 and the scanner unit 530 are mechanical structures to execute image formation processing in the printer 50. The scanner unit 530 includes the reading sensor 80 illustrated in FIG. 4. Although the printer 50 according to the present embodiment includes the scanner unit 530 as the reading device, the reading device can be an external device to the printer 50 (or the external to the printing system 1) and reading data of an image can be acquired from the external reading device.

The control panel 540 includes a panel display section 540a, such as a touch panel, and an input section 540b. The panel display section 540a displays current set values and selection screens and accepts an input from the user (an operator). The input section 540b includes a numeric keypad for accepting setting values of conditions (e.g., density setting) related to image formation, a start key for accepting a copy start instruction, and the like. The controller 510 controls the entire operation of the printer 50. For example, the controller 510 controls drawing, communication, input from the control panel 540, and the like. As illustrated in FIG. 3, the head array 600 is a recording head including the plurality of liquid discharge heads 69.

In response to an instruction via an application switching key on the control panel 540, the printer 50 selectively performs a document box function, a copy function, a print function, and a facsimile function. When the document box function is selected, the operation mode is changed to a document box mode to store document data. With selection of the copy function, the operation mode is changed to a copy mode. With selection of the print function, the operation mode is changed to a printer mode. With selection of the facsimile function, the operation mode is changed to a facsimile mode.

The controller 510 includes a central processing unit (CPU) 501 as a main component of a computer, a system memory 502 (MEM-P), a north bridge (NB) 503, a south bridge (SB) 504, an application specific integrated circuit (ASIC) 506, a local memory 507 (MEM-C), an HDD 508, and an HD 509 (a memory). In the controller 510, the NB 503 and the ASIC 506 are connected via an Accelerated Graphics Port (AGP) bus 505.

The CPU 501 is a controller that controls overall operation of the printer 50. The NB 503 is a bridge connecting the CPU 501 to the system memory 502, the SB 504, and the AGP bus 505. The NB 503 includes a memory controller for controlling data reading from and data writing in the system memory 502, a peripheral component interconnect (PCI) master, and an AGP target.

The system memory 502 includes a ROM 502a, which is a memory to store program and data for operating the controller 510, and a RAM 502b for developing programs and data and storing drawing data in printing. Alternatively, the program stored in the RAM 502b can be stored, for distribution, on any desired recording medium, such as a CD-ROM, a floppy disk (FD), a compact disc-recordable (CD-R), or a digital versatile disc (DVD), in a format installable on and executable by a computer. The SB 504 is a bridge connecting the NB 503 and a PCI device or a peripheral device. The ASIC 506 is an integrated circuit (IC) dedicated to image processing and includes hardware elements for image processing. The ASIC 506 serves as a bridge connecting the AGP bus 505, a PCI bus 511, the HDD 508, and the local memory 507 to each other. The ASIC 506 includes a PCI target, an AGP master, an arbiter (ARB) that is a core of the ASIC 506, a memory controller for controlling the local memory 507, a plurality of direct memory access controllers (DMACs) capable of rotation or the like of image data with a hardware logic, and a PCI unit that transfers data between the printer unit 520 and the scanner unit 530 through the PCI bus 511. The ASIC 506 can be configured to connect to a universal serial bus (USB) interface (I/F), an interface of the Institute of Electrical and Electronics Engineers 1394 (IEEE 1394), or both.

The local memory 507 is used as a buffer for image data to be copied or code image. The HD 509 is a storage to store various image data, font data for printing, and form data. The HDD 508 controls data reading from or data writing to the HD 509 under control of the CPU 501. The AGP bus 505 is a bus interface for a graphics accelerator card and is devised for accelerating graphic processing. The AGP bus 505 directly accesses the system memory 502 with high throughput to accelerate the graphics accelerator card.

Figure 7:
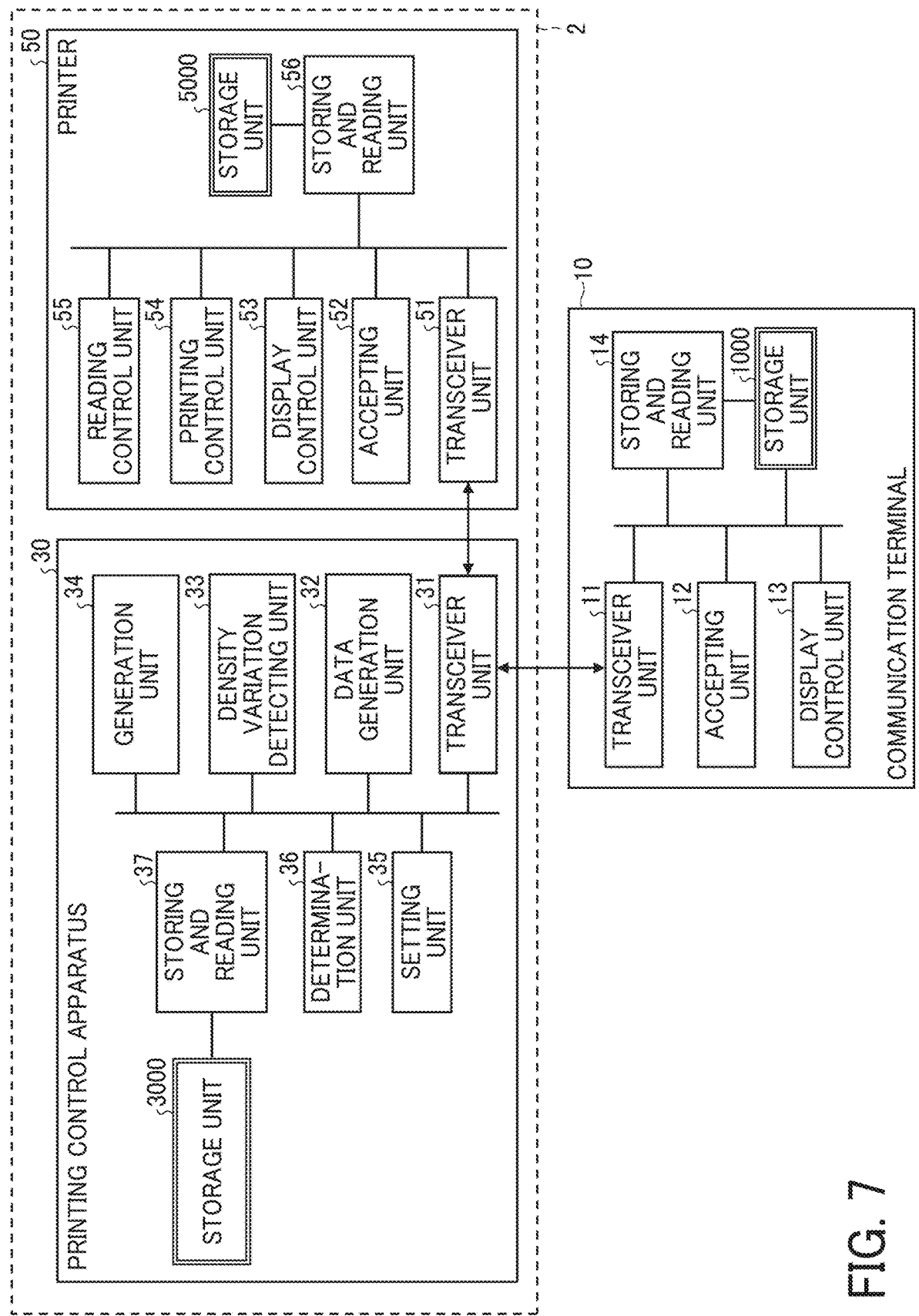
FIG. 7 is a block diagram illustrating an example of a functional configuration of the printing system according to Embodiment 1.

Referring to FIG. 7, a functional configuration of the printing system 1 is described.

FIG. 7 is a block diagram illustrating an example of the functional configuration of the printing system according to Embodiment 1.

A configuration of the communication terminal 10 is described.

Functions implemented by the communication terminal 10 illustrated in FIG. 7 include a transceiver unit 11, an accepting unit 12, a display control unit 13, a storing and reading unit 14, and a storage unit 1000.

The transceiver unit 11 functions to exchange various data with the printing control apparatus 30 via the LAN 8. The transceiver unit 11 is implemented, for example, by the network I/F 309 and a program executed by the CPU 301 illustrated in FIG. 5.

The accepting unit 12 functions to accept user input via an input device, such as the keyboard 311 illustrated in FIG. 5. The accepting unit 12 is implemented by, for example, a program executed by the CPU 301 illustrated in FIG. 5. The display control unit 13 functions to display various screen information on the display 308 illustrated in FIG. 5. For example, the display control unit 13 causes the display 308 to display, with a web browser, an operation screen or the like for accepting an input operation by the user. The display control unit 13 causes the display 308 to display a web page with, for example, hypertext markup language (HTML). The display control unit 13 is implemented by, for example, the display 308 illustrated in FIG. 5 and a program executed by the CPU 301 illustrated in FIG. 5.

The storing and reading unit 14 functions to store various data in and read various data from the storage unit 1000. The storing and reading unit 14 is implemented by, for example, a program executed by the CPU 301 illustrated in FIG. 5. The storage unit 1000 is implemented, for example, by the ROM 302 or the HD 304 illustrated in FIG. 5, or the like.

A functional configuration of the printing control apparatus 30 is described.

The functions implemented by the printing control apparatus 30 illustrated in FIG. 7 include a transceiver unit 31, a data generation unit 32, a density variation detecting unit 33, a generation unit 34, a setting unit 35, a determination unit 36, a storing and reading unit 37, and a storage unit 3000.

The transceiver unit 31 functions to exchange various data with the communication terminal 10 or the printer 50. The transceiver unit 31 transmits and receives various data to and from the communication terminal 10 via the LAN 8, for example. In addition, the transceiver unit 31 transmits and receives various data to and from the printer 50 via the dedicated line 9, for example. The transceiver unit 31 is implemented, for example, by the network I/F 309 and a program executed by the CPU 301 illustrated in FIG. 5.

The data generation unit 32 functions to generate data to be transmitted to the printer 50. For example, the data generation unit 32 generates processing data for performing printing process in the printer 50. The data generation unit generates correction data to be printed by the printer 50 based on, for example, a correction coefficient table 400 described later, generated by the generation unit 34. The data generation unit 32 is implemented by, for example, a program executed by the CPU 301 illustrated in FIG. 5. The data generation unit 32 is an example of a correction unit.

The density variation detecting unit 33 functions to calculate density variations in the read data transmitted from the printer 50. The density variation value in the read data is, for example, a difference between the maximum and the minimum of densities in the image (read image) formed by the head unit 610 based on the read data. Alternatively, the density variation value in the read data can be, for example, a maximum difference from the average density in the image (read image) formed by the head unit 610 based on the read data. The density variation detecting unit 33 is implemented by, for example, a program executed by the CPU 301 illustrated in FIG. 5 and the like.

The generation unit 34 functions to generate the correction coefficient table 400 for correcting the density variation, based on the density variation value calculated by the density variation detecting unit 33. The generation unit 34 is configured to calculate a correction value for correcting an output value of liquid (a setting value of the amount of liquid) discharged from the liquid discharge head 69. For example, the generation unit 34 calculates the correction value based on the output value from the liquid discharge head 69 and the density variation value calculated by the density variation detecting unit 33. Based on the calculated correction value, the generation unit 34 generates the correction coefficient table 400 for each liquid discharge head 69. Details of the correction coefficient table 400 will be described later. The generation unit 34 is implemented by, for example, a program executed by the CPU 301 illustrated in FIG. 5. The generation unit 34 is an example of a calculation unit. The generation unit 34 is an example of a generation unit.

The setting unit 35 functions to set various setting values in the printing operation of the printer 50. The setting unit 35 sets, for example, a threshold defining an allowable range of density variations of the image formed on the recording medium. The setting unit 35 is implemented by, for example, a program executed by the CPU 301 illustrated in FIG. 5.

The determination unit 36 functions to determine whether the density variation value calculated by the density variation detecting unit 33 is within the threshold set by the setting unit 35. For example, the determination unit 36 determines whether the density variation value calculated by the density variation detecting unit 33 is within the allowable range defined by the threshold. The determination unit 36 is implemented by, for example, a program executed by the CPU 301 illustrated in FIG. 5. The determination unit 36 is an example of a determination unit.

The storing and reading unit 37 functions to store various data in the storage unit 3000 or reading various data from the storage unit 3000. The storing and reading unit 37 is implemented by, for example, a program executed by the CPU 301 illustrated in FIG. 5. The storage unit 3000 is implemented, for example, by the ROM 302 illustrated in FIG. 5, the HD 304 illustrated in FIG. 5, or the like.

A functional configuration of the printer 50 is described.

Functions implemented by the printer 50 illustrated in FIG. 7 include a transceiver unit 51, an accepting unit 52, a display control unit 53, a printing control unit 54, a reading control unit 55, a storing and reading unit 56, and a storage unit 5000.

The transceiver unit 51 functions to exchange various data with the printing control apparatus 30 via the dedicated line 9. The transceiver unit 51 is implemented by, for example, the I/F 550 illustrated in FIG. 6, and programs executed by the ASIC 506 and the CPU 501 illustrated in FIG. 6.

The accepting unit 52 functions to accept user input via the input device (for example, the input section 540*b*) of the control panel 540 illustrated in FIG. 6. The accepting unit 52 is implemented by, for example, programs executed by the ASIC 506 and the CPU 501 illustrated in FIG. 6. The accepting unit 52 is an example of an accepting unit.

The display control unit 53 functions to display various screens on the control panel 540 (for example, the panel display section 540*a*) illustrated in FIG. 6. For example, the display control unit 53 causes the control panel 540 to display an operation screen or the like that accepts an input operation by the user, using a web browser. The display control unit 53 causes the control panel 540 to display, for example, a web page with HTML. The display control unit 53 is implemented by, for example, the control panel 540 illustrated in FIG. 6, and programs executed by the ASIC 506 and the CPU 501 illustrated in FIG. 6. The display control unit 53 is an example of an output unit. The control panel 540 is an example of an output device.

The printing control unit 54 functions to control printing of an image on a recording medium based on the image data transmitted from the printing control apparatus 30. For example, the printing control unit 54 controls the print timing of the data transmitted from the printing control apparatus 30 and performs printing adjustment based on an adjustment value set by the user. The printing control unit 54 is implemented by, for example, the printer unit 520 illustrated in FIG. 6, and programs executed by the ASIC 506 and the CPU 501. The printing control unit 54 is an example of the output unit. The printer unit 520 is an example of the output device.

The reading control unit 55 functions to control reading of data by the scanner unit 530. For example, the reading control unit 55 reads the image data printed under control of the printing control unit 54, using the scanner unit 530. The reading control unit 55 is implemented by, for example, the scanner unit 530 illustrated in FIG. 6, and programs executed by the ASIC 506 and the CPU 501 illustrated in FIG. 6. The reading control unit 55 is an example of a reading unit.

The storing and reading unit 56 functions to store various data in the storage unit 5000 or reading various data from the storage unit 5000. The storing and reading unit 56 is implemented by, for example, programs executed by the ASIC 506 and the CPU 501. The storage unit 5000 is implemented by the system memory 502, the local memory 507, the HD 509, or the like illustrated in FIG. 6, for example.

Referring to FIGS. 8 to 17, descriptions are given below of the density adjusting method in the print processing system according to Embodiment 1.

Figure 8:
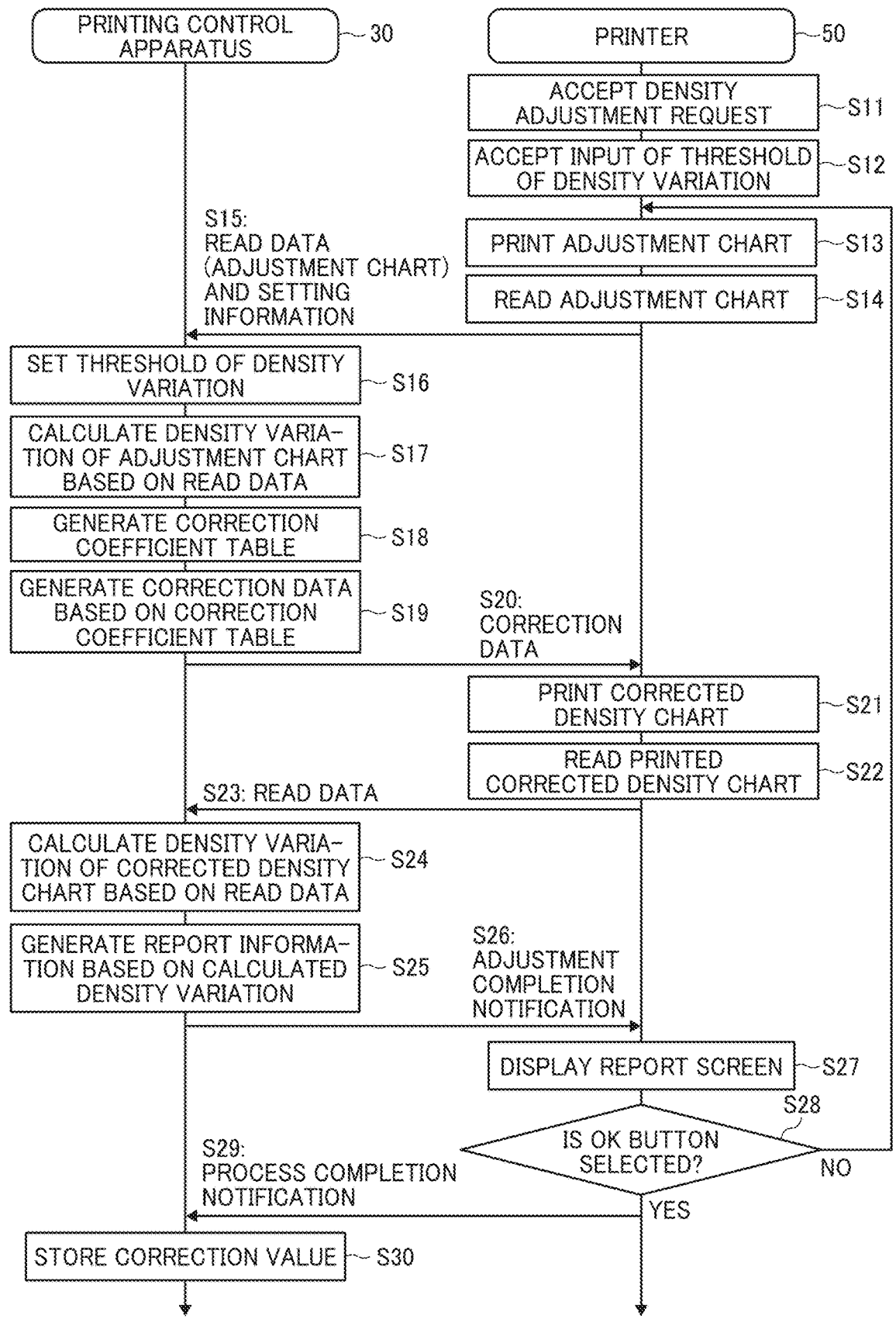
FIG. 8 is a sequence chart illustrating an example of density adjustment in a print processing system according to Embodiment 1.

FIG. 8 is a sequence chart illustrating an example of density adjustment in the print processing system according to Embodiment 1.

In S11, the accepting unit 52 of the printer 50 accepts an input of a density adjustment request from the user. Specifically, the user requests the start of the density adjustment on the operation screen displayed on the control panel 540 by the display control unit 53. The accepting unit 52 accepts an input made on the operation screen displayed on the control panel 540.

Figure 9:
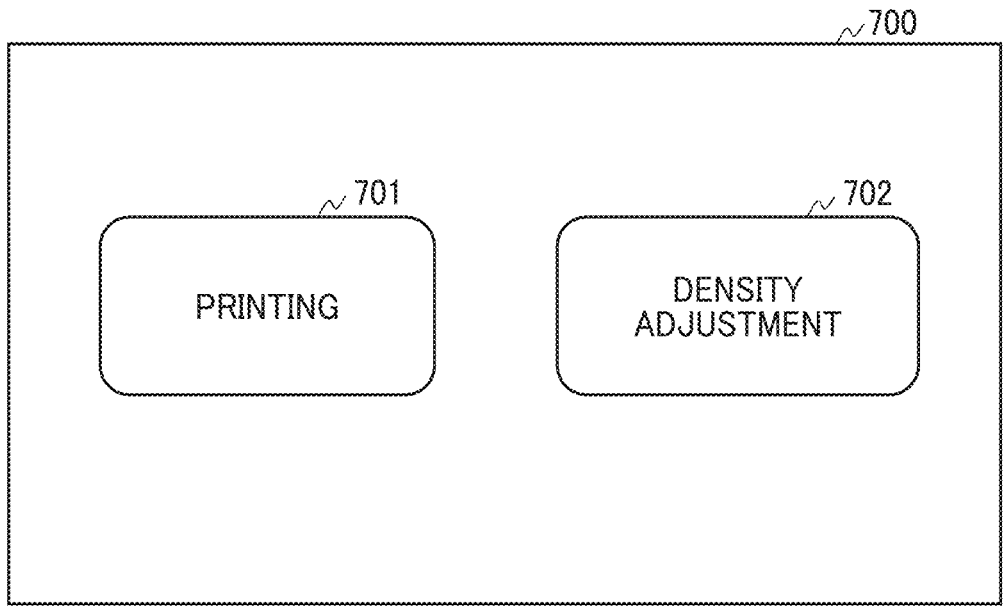
FIG. 9 illustrates an example of an operation screen displayed on the printer according to Embodiment 1.

Descriptions are given below of the operation screen displayed on the control panel 540 of the printer 50, with reference to FIG. 9. FIG. 9 illustrate an example of the operation screen displayed on the printer according to Embodiment 1. An operation screen 700 illustrated in FIG. 9 is displayed on the control panel 540, for example, when the printer 50 is activated. The operation screen 700 includes a selection icon 701 "PRINTING" for requesting printing and a selection icon 702 "DENSITY ADJUSTMENT" for requesting density adjustment. When the accepting unit 52 accepts an input to the selection icon 701 by the operator, the printer 50 executes printing on a recording medium. Meanwhile, when the accepting unit 52 accepts an input to the selection icon 702 by the operator, the printer 50 performs density adjustment of the image formed by the liquid discharged from the liquid discharge heads 69.

After the density adjustment request is accepted, in S12, the accepting unit 52 of the printer 50 accepts an input of the threshold (an allowable range) of density variations of the image formed on the recording medium. Specifically, when the input to the selection icon 702 illustrated in FIG. 9 is accepted, the display control unit 53 of the printer 50 causes the control panel 540 to display a threshold setting screen 710a illustrated in FIG. 10.

Figure 10:
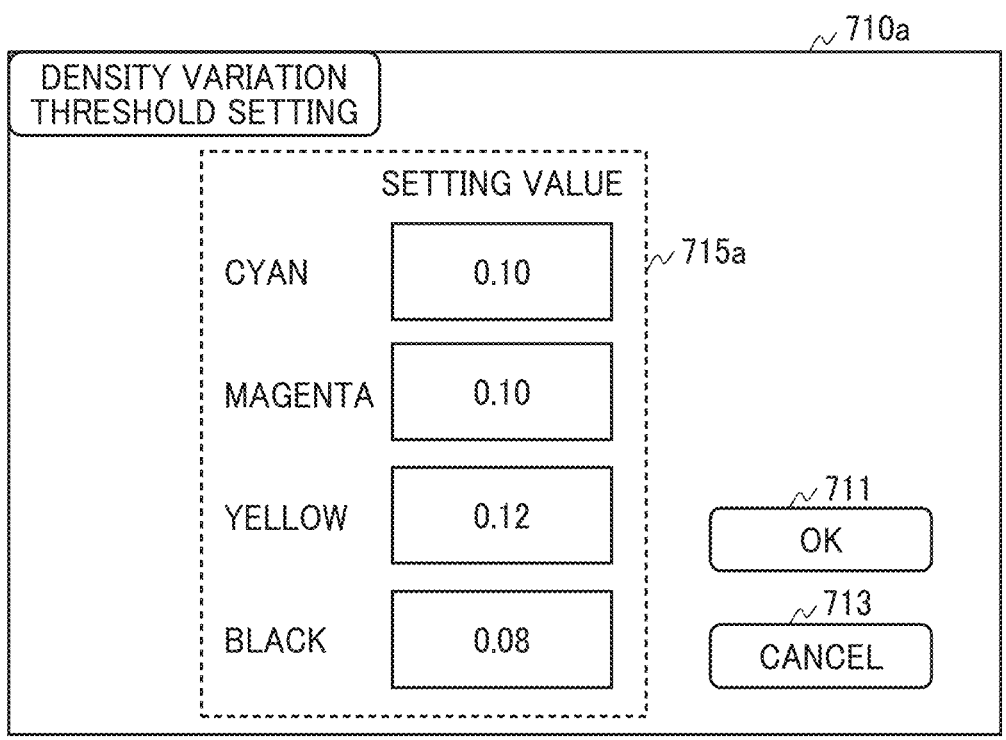
FIG. 10 illustrates an example of a threshold setting screen displayed on the printer according to Embodiment 1.

The threshold setting screen 710a illustrated in FIG. 10 is an example of a setting screen for prompting the user to set the threshold of the density variation of the image formed on the recording medium. The threshold setting screen 710a includes an input area 715a in which a threshold (setting value) of density variation can be input for each color of ink (liquid) discharged from the liquid discharge heads 69. The threshold setting screen 710a further includes an OK icon 711 to be pressed to start the density adjustment and a cancel icon 713 to be pressed to cancel the density adjustment.

The user inputs a numeric value in the input area 715a, to set a desired threshold of density variation for each color of ink (liquid) discharged from the liquid discharge heads 69. In the printer 50, the liquid discharge heads 69 of the same head unit 610 (the head units 610C, 610M, 610C, or 610K) discharge the same color ink. Therefore, the threshold for each head unit 610 is input via the threshold setting screen 710a. The input area 715a can be a selective field for allowing a user to select one of numerical values or an input field in which the user directly inputs a numerical value. Further, the density variation value set as the threshold can be the difference between the maximum and the minimum of the densities of the image formed by one head unit 610, or the maximum difference from the average density in the image formed by one head unit 610.

When accepting an input to the OK icon 711 in a state in which numerical values are input to the input area 715a, the printer 50 accepts a density adjustment request for the liquid discharge heads 69. The parameters that can be set on the threshold setting screen 710a are not limited those described above. Alternatively, on the threshold setting screen 710a, advanced settings (e.g., double-sided printing or single-sided printing, combined printing, etc.) of printing in the printer 50 can be set.

The user can set the threshold of the density variation (a tolerable density variation) of the image formed on the recording medium, via the threshold setting screen 710a illustrated in FIG. 10. Further, the threshold setting screen 710a is configured to allow the user to set the threshold of density variation for each color of ink (liquid) discharged from the liquid discharge head 69. With this configuration, the user can set a strict threshold for colors to be strictly controlled in density variation and a relatively loose threshold for other colors. With this configuration, in the density adjustment, the print processing system 2 can reduce the processing for the color for which density control is not severe, so that time for density variation correction for each head unit 610 does not become long more than necessary.

Another example of the threshold setting screen 710a will be described. A threshold setting screen 710b illustrated in FIG. 11 is an example display screen that permits omission of density variation threshold setting in an input area 715b in which the threshold (setting value) of density variation can be input for each color of ink (liquid) discharged from the liquid discharge head 69. The user can use the threshold setting screen 710b illustrated in FIG. 11 in order to set thresholds only for the colors used to print an image on a recording medium. Similar to the threshold setting screen 710a, the threshold setting screen 710b illustrated in FIG. 11 allows setting of the threshold for each color, that is, for each head unit 610. Accordingly, the user can omit setting of the density variation threshold for a given one or more of the head units 610. With this configuration, in the density adjustment, the print processing system 2 can reduce the processing for the head unit 610 not used in printing, so that the time for density variation correction for each head unit 610 does not become long.

As described above, in the print processing system 2, use of the threshold setting screen 710b is advantageous as follows. The head units 610 targeted for correction in the density adjustment can be limited in accordance with characteristics of the printed matter that the user intends to form, thereby shortening the time for the density adjustment. For example, in the example illustrated in FIG. 11, black is excluded from the targets for the density variation correction. Accordingly, the print processing system 2 eliminates the process of density adjustment for the head unit 610K, thereby saving the time for printing a corrected density chart 90 (to be described later) for the head unit 610K and the time for creating the correction coefficient table 400 for black.

Next, descriptions are given below of a threshold setting screen 710c illustrated in FIG. 12. The threshold setting screen 710c is an example of a display screen for allowing setting of different thresholds respectively for the liquid discharge heads 69 in each of the head units 610. In an input area 715c, respective thresholds of density variation can be set in segments divided in the direction in which the liquid discharge heads 69 are lined (the Z axis direction in FIG. 3), that is, the width direction of the sheet P (the recording medium). In one example, the segments can be divided freely. On printed matters, images do not necessarily extend entirely on the sheets P, and the sheet P may include a region where the image does not exist in the sheet width direction. With the threshold setting screen 710c illustrated in FIG. 12, the user can set different thresholds for an area where the image exists and for a blank area of the sheet P. Alternatively, the user can omit setting of the threshold depending on the region on the sheet P. Thus, in the print processing system 2, the threshold for the density adjustment can be flexibly set according to the image layout of the printed matter, such as a layout including a blank area or an area of a specific color. Further, the print processing system 2 can omit the processing for a blank area or the processing for the head unit 610 not used in printing, so that the time for density variation correction for each head unit 610 does not become long.

As described above, in the print processing system 2, use of the threshold setting screen 710c is advantageous in that the liquid discharge heads 69 targeted for correction in the density adjustment can be limited in accordance with characteristics of the printed matter that the user intends to form, thereby shortening the time for the density adjustment. For example, in the example illustrated in FIG. 12, the segments of the input area 715c in which no value is input are not targets for the density variation correction. Accordingly, the print processing system 2 can omit the density adjustment process for a blank area or an area permissive about density variations, thereby reducing the time required to generate the correction coefficient table 400 (described later) for such an area.

The threshold set via the threshold setting screen 710a, 710b, or 710c can be stored in the storage unit 3000 in advance. In such a case, when the density adjustment request is accepted in SI 1, the operation of the printer 50 proceeds to S13.

Referring back to FIG. 8, in S13, in response to an acceptance of the threshold by the accepting unit 52, the printing control unit 54 of the printer 50 performs, with the printer unit 520, the printing process of an adjustment chart 70 used for the density adjustment. The printer 50 stores in advance the printing parameters for printing the adjustment chart 70 in the storage unit 5000. The printing control unit 54 reads the printing parameters from the storage unit 5000 via the storing and reading unit 56, to execute the printing process of the adjustment chart 70. In S14, the reading control unit 55 of the printer 50 causes the scanner unit 530 to read the printed adjustment chart 70 (an example of reading). The printing process by the printing control unit 54 and the reading process by the reading control unit 55 are executed as a series of operations.

In S15, the transceiver unit 51 of the printer 50 transmits, to the printing control apparatus 30, the read data of the adjustment chart 70, read by the reading control unit 55, and setting information indicating the threshold accepted by the accepting unit 52. The transceiver unit 31 of the printing control apparatus 30 receives the read data and the setting information transmitted from the printer 50.

Figure 13D:
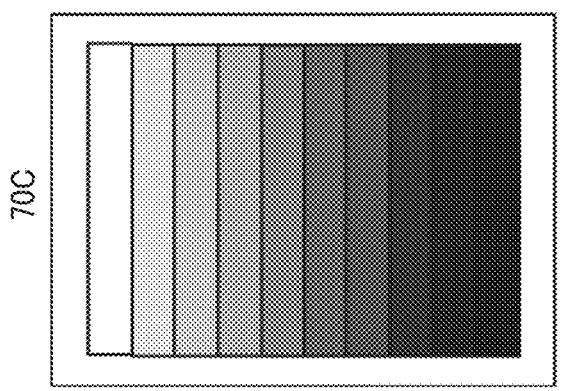
FIGS. 13A to 13D are diagrams illustrating examples of adjustment charts printed by the printer according to Embodiment 1.
Figure 13C:
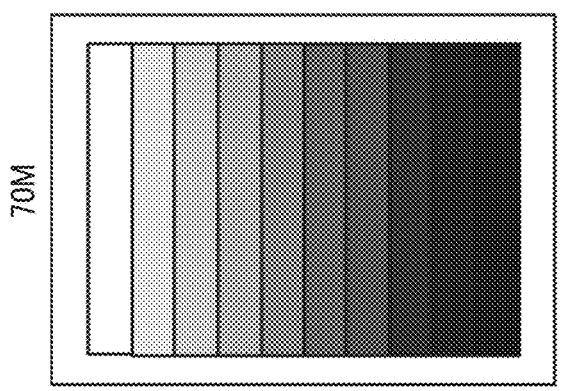
Figure 13B:
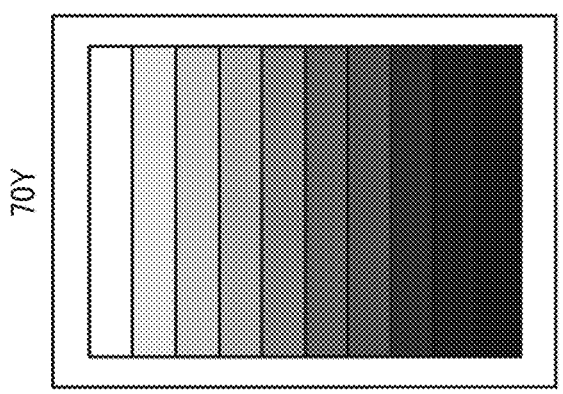
Figure 13A:
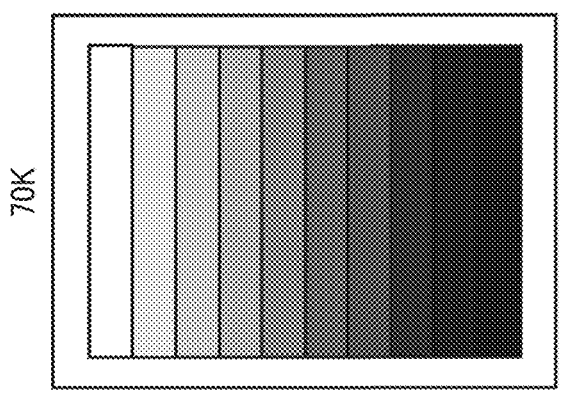

FIGS. 13A to 13D are diagrams illustrating examples of adjustment charts printed by the printer according to Embodiment 1. The printer 50 prints the adjustment chart 70 corresponding to each color (each head unit 610) in order to correct density variations in each head unit 610 (610C, 610M, 610C, or 610K). FIG. 13A illustrates a cyan adjustment chart 70C printed using the liquid discharge heads 69 of the head unit 610C. FIG. 13B illustrates a magenta adjustment chart 70M printed using the liquid discharge heads 69 of the head unit 610M. FIG. 13C illustrates a yellow adjustment chart 70Y printed using the liquid discharge heads 69 of the head unit 610Y. FIG. 13D illustrates a black adjustment chart 70K printed using the liquid discharge heads 69 of the head unit 610K. The adjustment charts 70C, 70M, 70Y, and 70K are collectively referred to as "adjustment charts 70".

Each adjustment chart 70 includes bands of different gradations (densities) arranged in order, to enable detection of density variations inside the head unit 610. In the example described here, the gradation value in one band in each adjustment chart 70 is uniform.

The reading sensor 80 (see FIG. 4), disposed in the passage of printing, reads each adjustment chart 70 printed by the printer 50. The printer 50 transmits the read data of each adjustment chart 70 to the printing control apparatus 30.

In S16, the setting unit 35 of the printing control apparatus 30 sets the threshold of density variation for each head unit 610, based on the setting information received by the transceiver unit 31. The setting unit 35 stores the setting information indicating the set threshold in the storage unit 3000 via the storing and reading unit 37.

In S17, the density variation detecting unit 33 of the printing control apparatus 30 calculates image density variations for each gradation on the adjustment chart 70, based on the read data of the adjustment chart 70 received by the transceiver unit 31. The density variation detecting unit 33 converts the read data in the red, green, and blue (RGB) format to a density. Based on the converted density, the density variation detecting unit 33 calculates the density variations for each gradation on the adjustment chart 70. The calculated value of density variation is, for example, a difference between the maximum and the minimum of densities in the image (read image) formed by the head unit 610 based on the read data. Alternatively, the calculated value of density variation can be, for example, the maximum difference from the average density in the image (read image) formed by the head unit 610 based on the read data.

In S18, the generation unit 34 of the printing control apparatus 30 generates the correction coefficient table 400 based on the density variations calculated by the density variation detecting unit 33 (an example of calculating). Specifically, based on the density variations calculated by the density variation detecting unit 33, the generation unit 34 calculates correction values of the image density for each liquid discharge head 69 of the head unit 610 that has printed the adjustment chart 70. Then, the generation unit 34 generates the correction coefficient table 400 using the calculated correction values.

Figure 14:
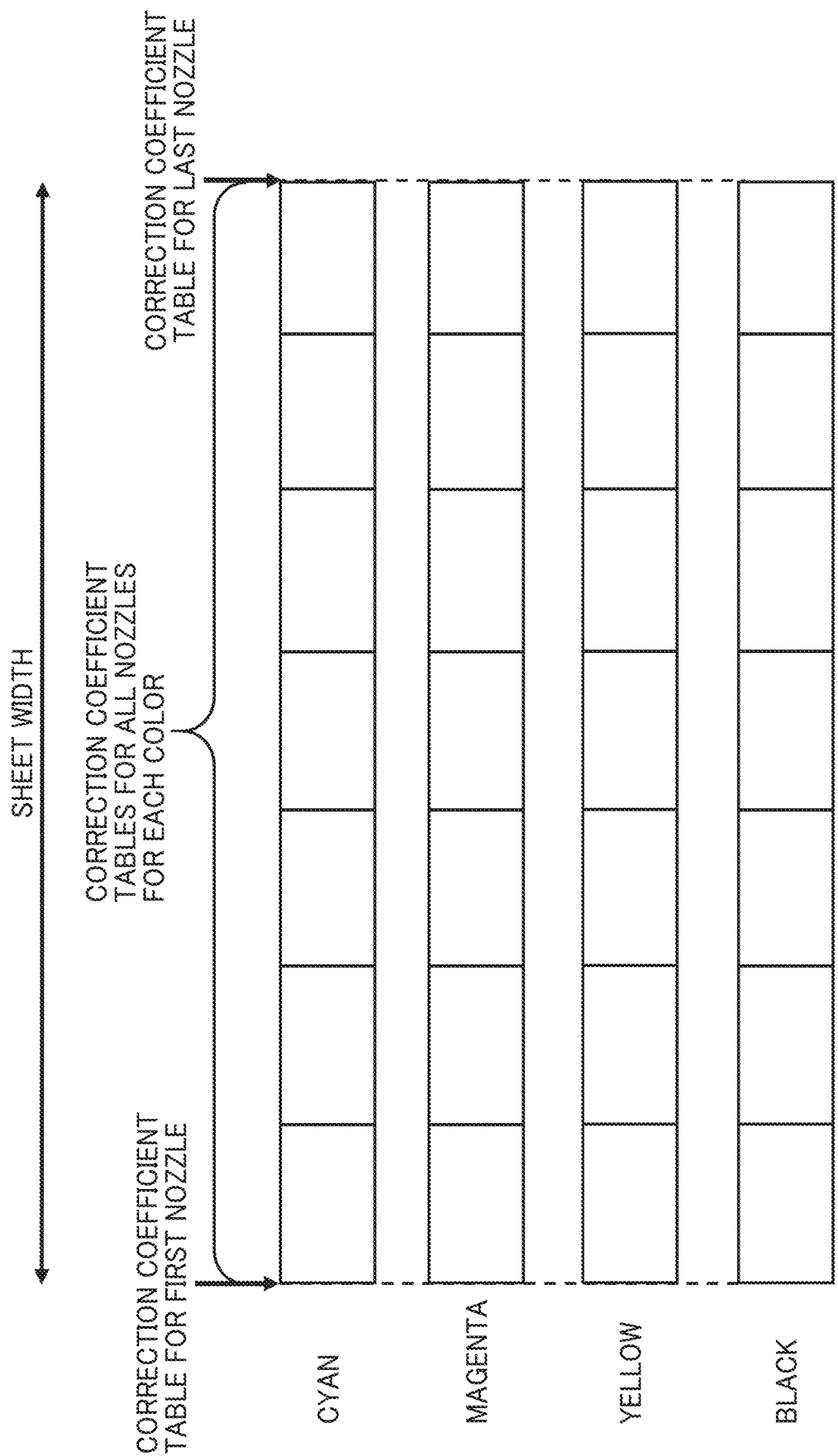
FIG. 14 is a diagram schematically illustrating a correction coefficient table according to Embodiment 1.
Figures 15A, 15B:
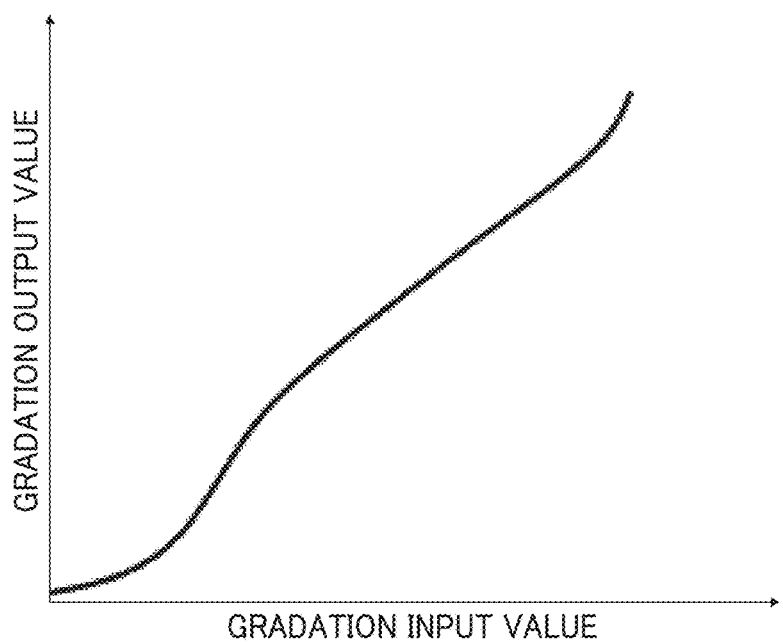
FIGS. 15A and 15B illustrate examples of relations between an input value and an output value for each gradation in the correction coefficient table according to Embodiment 1.

The correction coefficient table 400 generated by the generation unit 34 will be described with reference to FIGS. 14 to 15B. As illustrated in FIG. 14, the generation unit 34 generates the correction coefficient table 400 for each nozzle of all liquid discharge heads 69 regarding which density adjustment is performed. The generation unit 34 generates, for example, the correction coefficient table 400 for all nozzles for each color. Further, as illustrated in FIGS. 15A and 15B, the correction coefficient table 400 is a data table indicating the relation between input data and output data for each gradation. The correction coefficient table 400 illustrated in FIG. 15A is, for example, a data table including correction coefficients for 8-bit (0 to 255) data, and an input gradation value and an output gradation value for each gradation associated with each another are stored therein.

With this configuration, based on the density variations calculated for each gradation by the density variation detecting unit 33, the generation unit 45 calculates the correction value of the image density for each liquid discharge head 69 of the head unit 610 and generates the correction coefficient table 400 using the correction values.

Referring back to FIG. 8, in S19, based on the correction coefficient table 400 generated by the generation unit 34, the data generation unit 32 of the printing control apparatus 30 generates correction data to be printed by the printer 50. Specifically, the data generation unit 32 corrects the output values using the correction values, which respectively correspond to the liquid discharge heads 69, included in the correction coefficient table 400. Then, the data generation unit 32 generates correction data including the output values corresponding to the liquid discharge heads 69, respectively. In other words, by generation of the correction data, the data generation unit 32 corrects the density of the image printed by the printer 50.

In S20, the transceiver unit 31 of the printing control apparatus 30 transmits the correction data generated by the data generation unit 32 to the printer 50. The transceiver unit 51 of the printer 50 receives the correction data transmitted from the printing control apparatus 30.

In S21, the printing control unit 54 of the printer 50 executes a printing process of the corrected density chart 90 as a result of density correction based on the correction data received by the transceiver unit 51. In S22, the reading control unit 55 of the printer 50 causes the scanner unit 530 to read the corrected density chart 90 thus printed. Similar to the description above, the printing process by the printing control unit 54 and the reading process by the reading control unit 55 are executed as a series of operations.

In S23, the transceiver unit 51 of the printer 50 transmits the read data of the corrected density chart 90, read by the reading control unit 55, to the printing control apparatus 30. The transceiver unit 31 of the printing control apparatus 30 receives the read data transmitted from the printer 50.

Figure 16D:
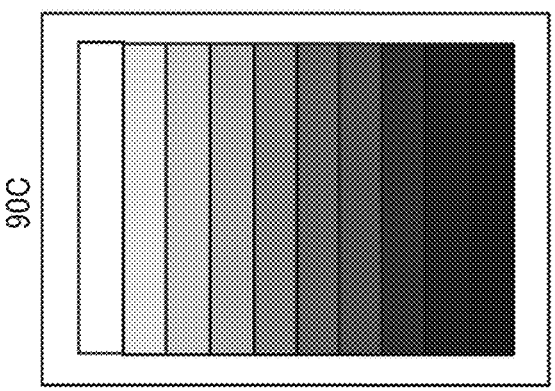
FIGS. 16A to 16D are diagrams illustrating examples of corrected density charts printed by the printer according to Embodiment 1.
Figure 16C:
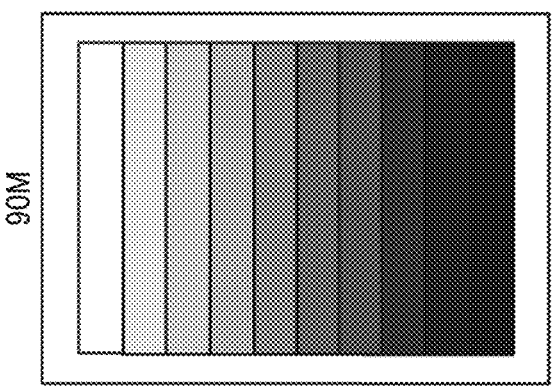
Figure 16B:
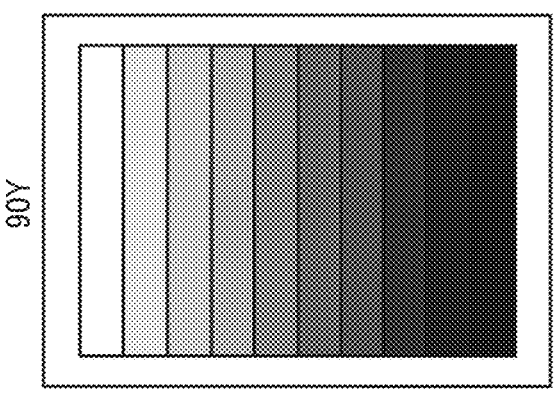
Figure 16A:
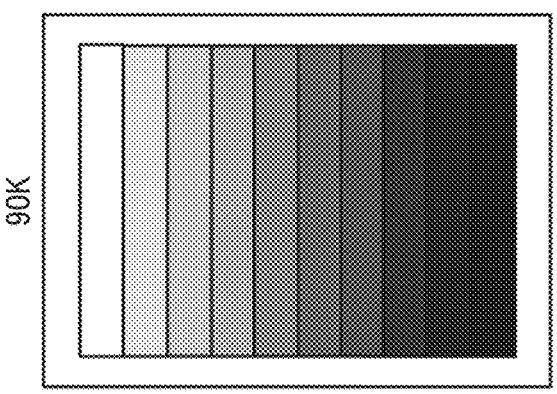

FIGS. 16A to 16D are diagrams illustrating examples of the corrected density charts printed by the printer according to Embodiment 1. The printer 50 prints the corrected density chart 90 corresponding to each color (each head unit 610), based on the correction data in which the image density is corrected using the correction coefficient table 400. FIG. 16A illustrates a cyan corrected density chart 90C printed using the liquid discharge heads 69 of the head unit 610C. FIG. 16B illustrates a magenta corrected density chart 90M printed using the liquid discharge heads 69 of the head unit 610M. FIG. 16C illustrates a yellow corrected density chart 90Y printed using the liquid discharge heads 69 of the head unit 610Y. FIG. 16D illustrates a black corrected density chart 90K printed using the liquid discharge heads 69 of the head unit 610K. The corrected density charts 90C, 90M, 90Y, and 90K are collectively referred to as "corrected density charts 90". Similar to the adjustment chart 70 illustrated in FIGS. 13A to 13D, each corrected density chart 90 includes bands of different gradations (densities) arranged in order. In the example described here, the gradation value in one band in each corrected density chart 90 is uniform.

The reading sensor 80 (see FIG. 4), disposed in the passage of printing, reads each corrected density chart 90 printed by the printer 50. The printer 50 transmits the read data of each of the read corrected density charts 90 to the printing control apparatus 30.

In S24, the density variation detecting unit 33 of the printing control apparatus 30 calculates image density variations of the corrected density chart 90 based on the read data of the corrected density chart 90 received by the transceiver unit 31 (an example of calculating). Since the process performed by the density variation detecting unit 33 in S24 is the same as the process in S17, the description thereof will be omitted.

In S25, the data generation unit 32 of the printing control apparatus 30 generates report information for reporting the density adjustment result to the user, based on the density variations calculated by the density variation detecting unit 33. Specifically, the determination unit 36 of the printing control apparatus 30 determines whether the density variations detected by the density variation detecting unit 33 are within the threshold set by the setting unit 35. The determination unit 36 identifies a color (the head unit 610) in which the density variations detected by the density variation detecting unit 33 are not within the threshold. The data generation unit 32 generates the report information, which indicates the relation between the density variations detected by the density variation detecting unit 33 and the threshold set by the setting unit 35. The report information includes, for example, the density variation value, the threshold, and information representing the color (the head unit 610) having density variations greater than the threshold.

In S26, the transceiver unit 31 of the printing control apparatus 30 transmits, to the printer 50, an adjustment completion notification including the report information generated by the data generation unit 32. The transceiver unit 51 of the printer 50 receives the adjustment completion notification transmitted from the printing control apparatus 30.

In S27, the display control unit 53 of the printer 50 causes the control panel 540 to display a report screen 730 illustrated in FIG. 17, based on the adjustment completion notification received by the transceiver unit 51 (an example of outputting). The report screen 730 illustrated in FIG. 17 is displayed to notify the user of the completion of density adjustment, in response to the completion of the density adjustment. Information displayed on the report screen 730 includes the threshold (setting value) of density variation set for each color of ink (liquid) discharged from the liquid discharge head 69 and the density variation value after correction of each color (a correction result). While viewing the report screen 730 displayed on the control panel 540, the user can grasp the density variation value after correction of each color in comparison with the set threshold.

Further, the report screen 730 provides a visual representation 735 (e.g., a mark, a symbol, a letter, a chart, etc.) to bring the user's attention to the color having density variations greater than the threshold. In the example illustrated in FIG. 17, the visual representation 735 is an exclamation mark (!). On the report screen 730, the user can grasp the color having density variations exceeding the threshold, observing the area indicated by the visual representation 735. The visual representation 735 is not limited to the example illustrated in FIG. 17 but can have any appearance to draw attention of the user to the corresponding area. The visual representation 735 can be other symbols such as a circle, a color coding, comments, and the like. Further, the report screen 730 can be configured to include only the setting value and the correction result without providing the visual representation 735.

As the accepting unit 52 of the printer 50 accepts selecting of an OK icon 733 on the report screen 730 illustrated in FIG. 17 (Yes in S28), the process proceeds to S29. In S29, the transceiver unit 51 of the printer 50 transmits a process completion notification to the printing control apparatus 30. The transceiver unit 31 of the printing control apparatus 30 receives the process completion notification transmitted from the printer 50.

In S30, in response to acceptance of the process completion notification by the transceiver unit 31, the storing and reading unit 37 of the printing control apparatus 30 stores the correction coefficient table 400 generated in S18 in the storage unit 3000. By contrast, as the accepting unit 52 accepts pressing of a continue icon 731 on the report screen 730 illustrated in FIG. 17 (No in S28), the process returns to S13 to repeat the density adjustment. Thus, the print processing system 2 can report, to the user, the density adjustment result together with the density variation threshold set by the user. This configuration enables the user to check whether the density is adjusted as desired and, simultaneously, to continue the density adjustment until the density variations are reduced to a desired range.

Although the report screen 730 including the report information is displayed (output) on the control panel 540 in the example described above, the method of outputting is not limited thereto. Alternatively, as another example of outputting, the printer 50 can be configured to print the same content as the report screen 730, thereby providing the user of the report information transmitted from the printing control apparatus 30.

As described above, the print processing system 2 according to Embodiment 1 reads, with the scanner unit 530 of the printer 50, the adjustment chart 70 and corrects density variations based on the read data of the adjustment chart 70. Then, the printing control apparatus 30 presents, to the user, the report information indicating whether the density variations are within the threshold, on the corrected density chart 90, as the result of the density correction. With this configuration, the print processing system 2 can clearly notify the user of the color (the head unit 610) having density variations greater than the threshold, thereby improving the efficiency in checking by the user of the image density.

Embodiment 2

Next, descriptions are given below of a printing system according to Embodiment 2. Note that elements similar to those of Embodiment 1 are given identical or similar reference characters, and redundant descriptions are omitted. The print processing system according to Embodiment 2 is configured to repeat density adjustment until density variations in the image formed on the recording medium, calculated by the printing control apparatus 30, decrease to or smaller than the threshold.

Figure 18:
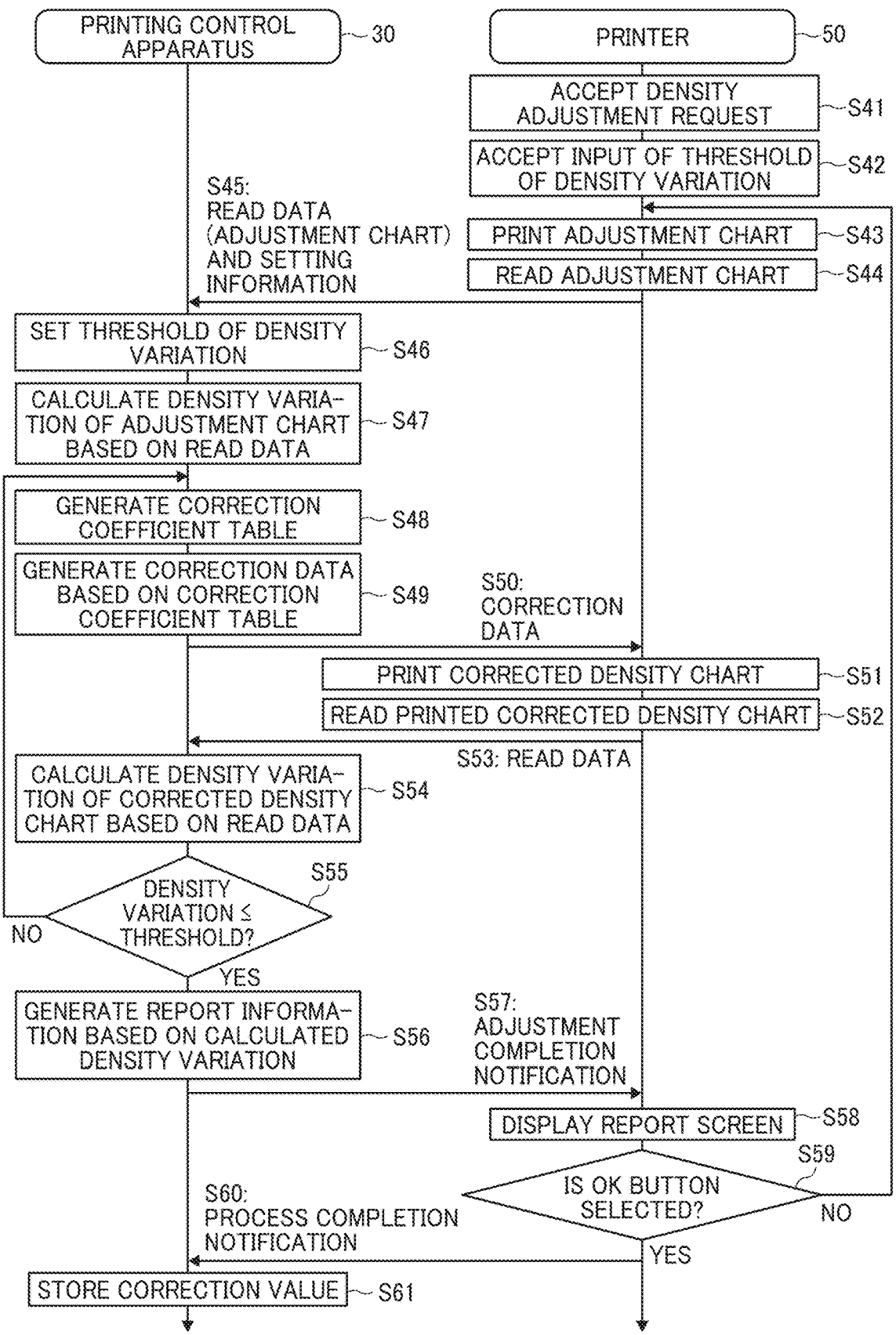
FIG. 18 is a sequence chart illustrating an example of density adjustment in a print processing system according to Embodiment 2.

FIG. 18 is a sequence chart illustrating an example of density adjustment in the print processing system according to Embodiment 2. The processes in S41 to S54 illustrated in FIG. 18 are the same as the processes in S11 to S24 illustrated in FIG. 8, and thus redundant descriptions are omitted.

In S55, the determination unit 36 of the printing control apparatus 30 determines whether the density variation value calculated by the density variation detecting unit 33 is equal to or smaller than the threshold set by the setting unit 35. In response to a determination that the variation value is equal to or smaller than the threshold, the operation of the printing control apparatus 30 proceeds to S56. In S56, the data generation unit 32 of the printing control apparatus 30 generates report information for reporting the density adjustment result to the user, based on the density variations calculated by the density variation detecting unit 33. The report information generated by the data generation unit 32 has the same content as that generated in S25 described above, and thus the description thereof is omitted.

By contrast, in S55, in response to a determination of the determination unit 36 that the density variation value calculated by the density variation detecting unit 33 is greater than the threshold set by the setting unit 35, the printing control apparatus 30 repeats the processing from S48. In other words, when the density variations on the corrected density chart 90 are not within the threshold, the printing control apparatus 30 performs the density adjustment of the corrected density chart 90. Therefore, the printing control apparatus 30 automatically repeats the density adjustment until the density variations of the image formed on the recording medium decrease to or within the threshold.

Alternatively, the determination unit 36 can be configured to determine that the density variations are within the allowable range and proceeds to S56, when the density variation value calculated by the density variation detecting unit 33 is smaller than the threshold. In this case, when the density variation value is equal to or greater than the threshold value, the determination unit 36 repeats the process from S48, determining that the density variation is not within the allowable range.

In S57, the transceiver unit 31 of the printing control apparatus 30 transmits, to the printer 50, an adjustment completion notification including the report information generated by the data generation unit 32. The transceiver unit 51 of the printer 50 receives the adjustment completion notification transmitted from the printing control apparatus 30.

In S58, the display control unit 53 of the printer 50 causes the control panel 540 to display the report screen 730 illustrated in FIG. 17, based on the adjustment completion notification received by the transceiver unit 51. Note that the report screen displayed on control panel 540 according to Embodiment 2 can be the same as the report screen 730 illustrated in FIG. 17. Alternatively, for example, the report screen can provide the setting values and correction result information without the visual representation 735.

As the accepting unit 52 of the printer 50 accepts selecting of the OK icon 733 (OK button) on the report screen 730 illustrated in FIG. 17 (Yes in S59), the process proceeds to S60. In S60, the transceiver unit 51 of the printer 50 transmits a process completion notification to the printing control apparatus 30. The transceiver unit 31 of the printing control apparatus 30 receives the process completion notification transmitted from the printer 50.

In S61, in response to acceptance of the process completion notification by the transceiver unit 31, the storing and reading unit 37 of the printing control apparatus 30 stores the correction coefficient table 400 generated in S48 in the storage unit 3000. By contrast, as the accepting unit 52 accepts pressing of the continue icon 731 on the report screen 730 illustrated in FIG. 17 (No in S59), the process proceeds to S43 to repeat the density adjustment.

As described above, the print processing system according to Embodiment 2 is configured to determine whether the density variations are restricted to the threshold and repeat the density adjustment until the density variations in an image formed by one head unit 610 come within the threshold. Thus, the print processing system according to Embodiment 2 does not rely on the user's visual checking in order to determine whether the density variations are within the desired range but automatically performs quantitative evaluation based on the threshold set by the user, thereby preventing reworking in the density adjustment.

As described above, according to an aspect of the present disclosure, an image forming system (for example, the print processing system 2) includes an image forming apparatus (for example, the printer 50), a reading device (for example, the scanner unit 530) configured to read an image formed on a recording medium by the image forming apparatus, a reading unit (for example, the reading control unit 55) configured to control the reading device, a calculation unit (for example, the generation unit 34) configured to calculate a correction value of the image density of the read image, and an output unit (for example, the display control unit 53) configured to display, based on the calculated correction value, report information representing a relation between a density variation of a corrected image (for example, the corrected density chart 90) on a recording medium and a threshold (an allowable range) of the density variation of the image formed on the recording medium. With this configuration, the image forming system (for example, the print processing system 2) can clearly notify the user of whether the density variations are within the threshold, thereby improving the efficiency in checking by the user of the image density.

According to another aspect, the image forming system (for example, the print processing system 2) further includes a determination unit (for example, the determination unit 36) configured to determine whether the density variation of the corrected image (for example, the corrected density chart 90) is within the threshold. In response to a determination that the density variation of the corrected image (for example, the corrected density chart 90) exceeds the allowable range (not smaller than the threshold or greater than threshold), the calculation unit (for example, the generation unit 34) calculates a correction value of the image density of the corrected image. In response to a determination that the density variation of the corrected image (for example, the corrected density chart 90) is within the allowable range (smaller than the threshold or not greater than the threshold), the output unit (for example, the display control unit 53) outputs the report information on a display device (for example, the control panel 540). Thus, the image forming system does not rely on the user's visual checking to determine whether the density variation is within the desired range but automatically performs quantitative evaluation based on the threshold set by the user, thereby preventing reworking in the density adjustment.

According to another aspect, in the image forming system (for example, the print processing system 2), the report information indicates whether the density variation of the corrected image (for example, the corrected density chart 90) is within the threshold, and the output unit (for example, the display control unit 53) displays, on the display device (for example, the control panel 540), the density variation value of the corrected image and the threshold. Thus, the image forming system causes the control panel 540 to display the report screen 730 including the density variation value and the corresponding threshold, so that the user can easily determine whether the density variation is within the threshold. Accordingly, the efficiency in checking by the user of the image density can improve.

According to another aspect, in the image forming system (for example, the print processing system 2), the report information includes visual representation (e.g., the visual representation 735) indicating that the density variation value of the corrected image (for example, the corrected density chart 90) is not within the threshold. With the visual representation, the image forming system can help the user to easily recognize the color corresponding to the corrected density chart 90 (the head unit 610) having density variations greater than the threshold. Accordingly, the effectively in checking of image density by the user can improve.

According to another aspect, the image forming system (for example, the print processing system 2) further includes an accepting unit (e.g., the accepting unit 52) configured to accept an input of the threshold of the density variation of the image on the recording medium, and the report information indicates the relation between the density variation of the corrected image (for example, the corrected density chart 90) and the threshold accepted by the accepting unit (e.g., the accepting unit 52). With this configuration, the image forming system can perform the density adjustment based on the desired threshold value input by the user. Accordingly, the image forming system can flexibly set the range of density variation permissive in the density adjustment, in accordance with characteristics of the printed matter that the user intends to form.

According to another aspect, in the image forming system (for example, the print processing system 2), the image forming apparatus (e.g., the printer 50) includes a plurality of head units (e.g., the head units 610), each of which includes a plurality of liquid discharge heads (e.g., the liquid discharge heads 69) to apply liquid to a recording medium. The accepting unit (e.g., the accepting unit 52) accepts the input of the threshold for each head unit, and the report information indicates the relation between the density variation of the image formed by the liquid discharged from the liquid discharge heads of the same head unit and the threshold corresponding to that head unit. With this configuration, the image forming system can limit the head units targeted for correction in the density adjustment, in accordance with characteristics of the printed matter that the user intends to form, thereby shortening time for the density adjustment.

According to another aspect, in the image forming system (e.g., the print processing system 2), the accepting unit (e.g., the accepting unit 52) accepts the input of the threshold for each liquid discharge head (e.g., the liquid discharge head 69), and the report information indicates the relation between the density variation of the image formed by the liquid discharged from the liquid discharge head and the threshold corresponding to the liquid discharge head. With this configuration, the image forming system can limit the liquid discharge heads targeted for correction in the density adjustment, in accordance with characteristics of the printed matter that the user intends to form, thereby shortening time for the density adjustment.

Another aspect of the present disclosure concerns a density adjusting method performed by an image forming system (for example, the print processing system 2). The density adjusting method includes reading an image formed on a recording medium by an image forming apparatus (e.g., the printer 50), calculating a correction value of an image density of the read image, forming, on a recording medium, a corrected image (e.g., the corrected density chart 90) based on the correction value of the density of the read image, reading the corrected image, and outputting report information representing a relation between a density variation of the corrected image and a threshold defining an allowable range of the density variation of the image formed on the recording medium. The density adjusting method described above can clearly notify the user of whether the density variations are within the threshold, thereby improving the efficiency in checking by the user of the image density.

In each embodiment of the present disclosure, the recording medium (an object) to bear a printed image is not limited to paper sheets, as long as a liquid can adhere thereto at least temporarily. The recording medium to bear an image is a material to which a liquid adheres and fastens thereto, or a material to which a liquid adheres and permeates. The recording medium is, for example, a medium such as recording paper, a recording sheet, film, or cloth; an electronic component such as an electronic substrate or a piezoelectric element; or a medium such as a powder layer (a granular material layer), an organ model, or an inspection cell. That is, the recording medium can be anything to which the liquid adheres. The material of the recording medium can be any material, such as paper, thread, fiber, cloth, leather, metal, plastic, glass, wood, ceramics, or the like, as long as liquid can adhere at least temporarily.

In each embodiment of the present disclosure, the liquid discharged from the liquid discharge heads 69 is not limited as long as the liquid has a viscosity and a surface tension to allow the liquid to be discharged from the liquid discharge heads 69. The liquid to be applied is not particularly limited but preferably has a viscosity of 30 mPa·s or lower under ordinary temperature and ordinary pressure or by heating and cooling. Specifically, the liquid is, for example, a solution, a suspension, or an emulsion including a solvent, such as water or organic solvent, a colorant, such as a dye or a pigment, a polymerizable compound, a resin, a functional material, such as a surfactant, a biocompatible material, such as deoxyribonucleic acid (DNA), amino acid, protein, or calcium, or an edible material, such as a natural colorant. Such a solution, a suspension, or an emulsion can be used for, e.g., inkjet ink, a surface treatment liquid, liquid for forming components of electronic elements or light-emitting elements, liquid for forming resist patterns of electronic circuits, or a material solution for three-dimensional fabrication. Further, in each embodiment of the present disclosure, the liquid discharge heads 69 include a device to discharge a liquid, a device to jet a liquid, a device to apply a liquid to a medium, and the like.

The functions of the embodiments of the present disclosure can be implemented by a computer executable program described in a legacy programming language such as an assembler, C, C++, C #, and Java (registered trademark), or an object-oriented programming language, and the program to implement the functions in each embodiment can be distributed via a telecommunication line.

The program for executing the functions of the embodiments of the present disclosure can be stored, for distribution, on a readable recording medium such as a ROM, an electrically erasable programmable read-only memory (EEPROM), an erasable programmable read-only memory (EPROM), a flash memory, a flexible disk (FD), a CD-ROM, a DVD-ROM, a DVD-RAM, a DVD-Rewritable (DVD-RW), a Blu-ray disc, a secure digital (SD) card, a magneto-optical disc (MO), and etc.

Furthermore, some or all of the functions of the embodiments of the present disclosure can be implemented on a programmable device (PD) such as a field programmable gate array (FPGA) or can be implemented as an ASIC. That is, the functions can be, stored on a recording medium for distribution, as data written in circuit configuration data (bit stream data) to be downloaded on the PD to implement the functions of the embodiments thereon, hardware description language (HDL) for generating circuit configuration data, very high speed IC hardware description language (VHDL), Verilog-HDL, or the like.

Although the image forming system, the density adjusting method, the program, and the recording medium storing the program are described above as embodiments of the present disclosure, the present disclosure is not limited thereto. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. An image forming system comprising:
an image forming apparatus configured to form an image on a recording medium;
an output device configured to output information for a user; and
circuitry configured to:
    acquire, from a reading device, read data of an image on the recording medium read by the reading device;
    calculate a correction value of an image density of the read image;
    cause the image forming apparatus to form, on a recording medium, a corrected image based on the correction value;
    acquire, from the reading device, read data of the corrected image; and
    cause the output device to output report information representing a relation between a density variation value of the corrected image and a threshold of the density variation value.
2. The image forming system according to claim 1, wherein the circuitry is configured to:
    determine whether the density variation value of the corrected image is within the threshold;
    calculate a correction value of an image density of the corrected image in response to a determination that the density variation value of the corrected image is not within the threshold; and
    output the report information in response to a determination that the density variation value of the corrected image is within the threshold.
3. The image forming system according to claim 1, wherein the report information indicates whether the density variation value of the corrected image is within the threshold, and
wherein the circuitry is configured to output the threshold, together with the density variation value of the corrected image.
4. The image forming system according to claim 1, wherein the report information includes a visual representation indicating that the density variation value of the corrected image is not within the threshold.
5. The image forming system according to claim 1, wherein the circuitry is configured to accept an input of the threshold, and wherein the report information indicates a relation between the density variation value of the corrected image and the threshold accepted.

6. The image forming system according to claim 5, wherein the image forming apparatus includes a plurality of head units each of which includes a plurality of liquid discharge heads configured to apply liquid to the recording medium to form an image on the recording medium,
wherein the circuitry is configured to accept an input of the threshold for each of the plurality of liquid discharge heads, and
wherein the report information indicates, for each head unit, a relation between a density variation value of a corrected image formed by the head unit and the threshold corresponding to the head unit.

7. The image forming system according to claim 6, wherein the circuitry is configured to accept an input of the threshold for each of the plurality of liquid discharge heads, and
wherein the report information indicates, for each liquid discharge head, a relation between a density variation value of a corrected image formed by the liquid discharge head and the threshold corresponding to the liquid discharge head.

8. The image forming system according to claim 1, wherein the circuitry is configured to:
generate a correction coefficient table to correct the image density of the read image based on the correction value; and
correct the image density of the image formed on the recording medium with reference to the correction coefficient table.

9. The image forming system according to claim 1, further comprising an image formation control apparatus connected to the image forming apparatus and configured to control image formation in the image forming apparatus.

10. A density adjusting method performed by an image forming system, the density adjusting method comprising:
acquiring read data of an image formed on a recording medium by an image forming apparatus;
calculating a correction value of an image density of the read image;
forming, with the image forming apparatus, a corrected image on a recording medium, based on the correction value of the image density of the read image;
acquiring read data of the corrected image; and
outputting report information representing a relation between a density variation value of the corrected image and a threshold of the density variation value.

11. A non-transitory recording medium storing a plurality of program codes which, when executed by one or more processors, causes the processors to perform a density adjusting method, the method comprising:
acquiring read data of an image formed on a recording medium by an image forming apparatus;
calculating a correction value of an image density of the read image;
forming, with the image forming apparatus, a corrected image on a recording medium, based on the correction value of the image density of the read image;
acquiring read data of the corrected image; and
outputting report information representing a relation between a density variation value of the corrected image and a threshold of the density variation value.

* * * * *